US012247417B2

(12) United States Patent
Okada

(10) Patent No.: US 12,247,417 B2
(45) Date of Patent: Mar. 11, 2025

(54) LOCKING DEVICE AND REFRIGERATION DEVICE

(71) Applicant: PHC Holdings Corporation, Tokyo (JP)

(72) Inventor: Tadashi Okada, Saitama (JP)

(73) Assignee: PHC HOLDINGS CORPORATION, Tokyo (JP)

( * ) Notice: Subject to any disclaimer, the term of this patent is extended or adjusted under 35 U.S.C. 154(b) by 194 days.

(21) Appl. No.: 18/108,381

(22) Filed: Feb. 10, 2023

(65) Prior Publication Data

US 2023/0193661 A1 Jun. 22, 2023

Related U.S. Application Data

(63) Continuation of application No. PCT/JP2021/037019, filed on Oct. 6, 2021.

(30) Foreign Application Priority Data

Nov. 13, 2020 (JP) ................................ 2020-189351

(51) Int. Cl.
*E05B 65/00* (2006.01)
*E05B 13/10* (2006.01)
*F25D 23/02* (2006.01)

(52) U.S. Cl.
CPC .......... *E05B 65/0042* (2013.01); *E05B 13/10* (2013.01); *F25D 23/028* (2013.01)

(58) Field of Classification Search
None
See application file for complete search history.

(56) References Cited

U.S. PATENT DOCUMENTS 5,737,939 A * 4/1998 Valence .................. F25D 11/04 312/401
7,337,628 B2 * 3/2008 Okuda .................. F25D 23/025 62/447

(Continued)

FOREIGN PATENT DOCUMENTS

CA 2279472 A1 * 9/2000 ............. E05B 83/36
CN 109372335 A * 2/2019 ............... E05B 3/00

(Continued)

OTHER PUBLICATIONS

International Search Report dated Nov. 16, 2021 issued in International Patent Application No. PCT/JP2021/037019, with English translation.

*Primary Examiner* — Hanh V Tran
(74) *Attorney, Agent, or Firm* — Rimon P.C.

(57) ABSTRACT

A locking device includes a lever configured to sway around a rotation axis and including a restriction part restricting an operation of a handle, a hole, and an attaching portion where a moving member configured to move in accordance with an operation of an actuator is attached; and a pressure member disposed in the hole and configured to make a first back-and-forth movement in accordance with an unlocking operation of a key. The pressure member moves the restriction part from a position for restricting the operation of the handle to a position for allowing the operation of the handle by swaying the lever around the rotation axis by pressing a first portion which is a portion of the hole in a forward movement of the first back-and-forth movement, and moves away from the first portion without swaying the lever in a backward movement of the first back-and-forth movement.

9 Claims, 14 Drawing Sheets

(56) References Cited

U.S. PATENT DOCUMENTS

| | | | | |
|---|---|---|---|---|
| 7,469,564 | B1 * | 12/2008 | Shaw | E05B 47/023<br>70/279.1 |
| 7,871,113 | B2 * | 1/2011 | Watanabe | E05C 3/043<br>292/241 |
| 9,097,037 | B2 * | 8/2015 | McKibben | E05B 47/0001 |
| 9,835,360 | B2 * | 12/2017 | Wang | F25B 49/022 |
| 11,414,892 | B2 * | 8/2022 | Holtgrewe | E05B 65/1006 |
| 11,851,915 | B2 * | 12/2023 | Kumar | F16H 1/04 |
| 2018/0216376 | A1 * | 8/2018 | Okada | F25D 23/02 |
| 2018/0245375 | A1 * | 8/2018 | Arlinghaus | E05B 17/22 |

FOREIGN PATENT DOCUMENTS

| | | | | | |
|---|---|---|---|---|---|
| CN | 111140105 | A | * | 5/2020 | |
| CN | 211795260 | U | * | 10/2020 | A47B 81/005 |
| DE | 102006024685 | B4 | * | 11/2012 | E05B 47/0012 |
| JP | 6392466 | B2 | | 9/2018 | |
| WO | WO-2005066913 | A2 | * | 7/2005 | E05B 17/0029 |
| WO | WO-2017039197 | A1 | * | 3/2017 | E05B 13/001 |
| WO | WO-2019042993 | A1 | * | 3/2019 | E05B 47/0012 |

* cited by examiner

LOCKING DEVICE AND REFRIGERATION DEVICE

CROSS-REFERENCE OF RELATED APPLICATIONS

This application is a Continuation of International Patent Application No. PCT/JP2021/037019, filed on Oct. 6, 2021, which in turn claims the benefit of Japanese Patent Application No. 2020-189351, filed on Nov. 13, 2020, the entire disclosures of which Applications are incorporated by reference herein.

TECHNICAL FIELD

The present disclosure relates to a locking device and a refrigeration device.

BACKGROUND ART

PTL 1 discloses a handle attached to a door of a refrigeration device including a storage compartment. When operated in the state where the door is closed, the handle restricts and allows an operation of changing the door from the closed state to the open state. The handle is provided with a manual locking device that restricts (i.e., locks) and allows (i.e., unlocks) the operations of the handle.

CITATION LIST

Patent Literature

PTL 1
Japanese Patent Publication No. 6392466

SUMMARY OF INVENTION

Technical Problem

Incidentally, the handle may include both the manual locking device and the electronic locking device. In the case where both the manual locking device and the electronic locking device are provided, the user may not know which locking device, manual or electronic, restricts the operation of the handle. This can make it time-consuming for the user to operate the handle.

For solving such conventional problems, an object of the present disclosure is to provide a locking device that can easily lock and unlock in the manual and electric manner.

Solution to Problem

To achieve the above-mentioned object, a locking device of the present disclosure includes a lever member configured to sway around a first rotation axis and including a restriction part configured to restrict an operation of a handle, a hole, and an attaching portion where a moving member configured to move in accordance with an operation of an electromagnetic actuator is attached; and a pressure member disposed in the hole and configured to make a first back-and-forth movement in the hole in accordance with an unlocking operation of a key. The pressure member moves the restriction part from a position for restricting the operation of the handle to a position for allowing the operation of the handle by swaying the lever member around the first rotation axis by pressing a first portion in a forward movement of the first back-and-forth movement, and moves away from the first portion without swaying the lever member in a backward movement of the first back-and-forth movement, the first portion being a portion of an inner peripheral surface of the hole.

In addition, to achieve the above-mentioned object, a refrigeration device of the present disclosure includes the locking device of the present disclosure.

Advantageous Effects of Invention

With the locking device and the refrigeration device according to the present disclosure, it is possible to easily lock and unlock in the manual and electric manner.

DESCRIPTION OF EMBODIMENTS

Figure 1:
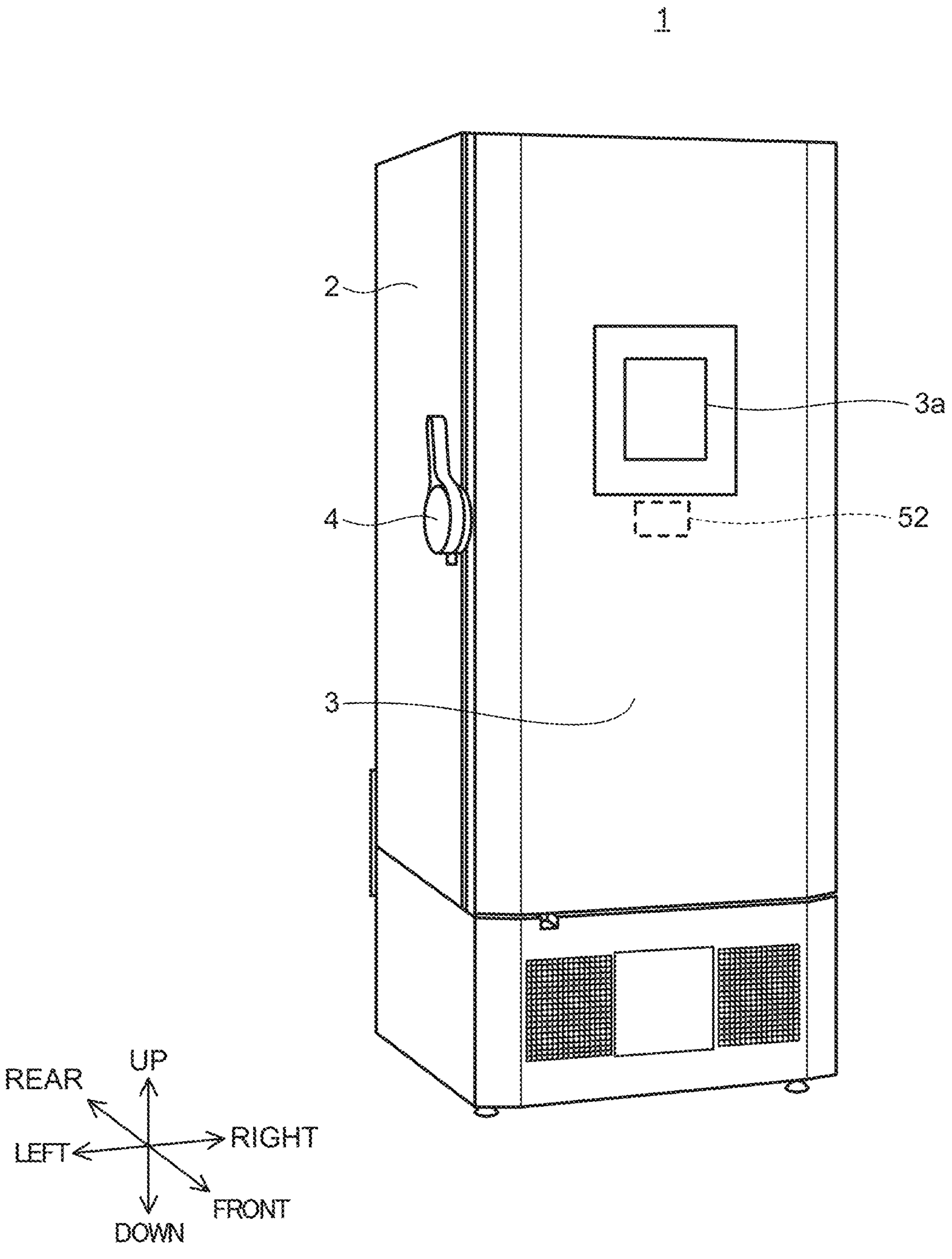
FIG. 1 is a perspective view of a refrigeration device according to an embodiment of the present disclosure.

A locking device and a refrigeration device of an embodiment of the present disclosure are described below with reference to the drawings. Note that for convenience of the description below, the upper side and lower side in FIG. 1 are the upper side and lower side of refrigeration device 1 respectively; the upper left side and lower right side are rear side and front side of refrigeration device 1, respectively; and the left side and right side are the left side of and right side of refrigeration device 1, respectively.

Locking device 50 is attached to refrigeration device 1 such as an ultra-low-temperature freezer in which the temperature inside a storage compartment (not illustrated in the drawing) is −80° C. or below, for example.

As illustrated in FIG. 1, refrigeration device 1 includes box 2 including inside a storage compartment (not illustrated in the drawing) that opens to the front side, door 3 that opens and closes the opening of the storage compartment, and handle 4 attached to door 3. In addition, box 2 includes a refrigeration circuit (not illustrated in the drawing) that cools the inside of the storage compartment.

Door 3 is connected to box 2 through a hinge (not illustrated in the drawing) disposed on the right side. Door 3 is a right-opening door. In addition, door 3 is provided with operation panel 3*a* for the user to operate refrigeration device 1.

Figure 2:
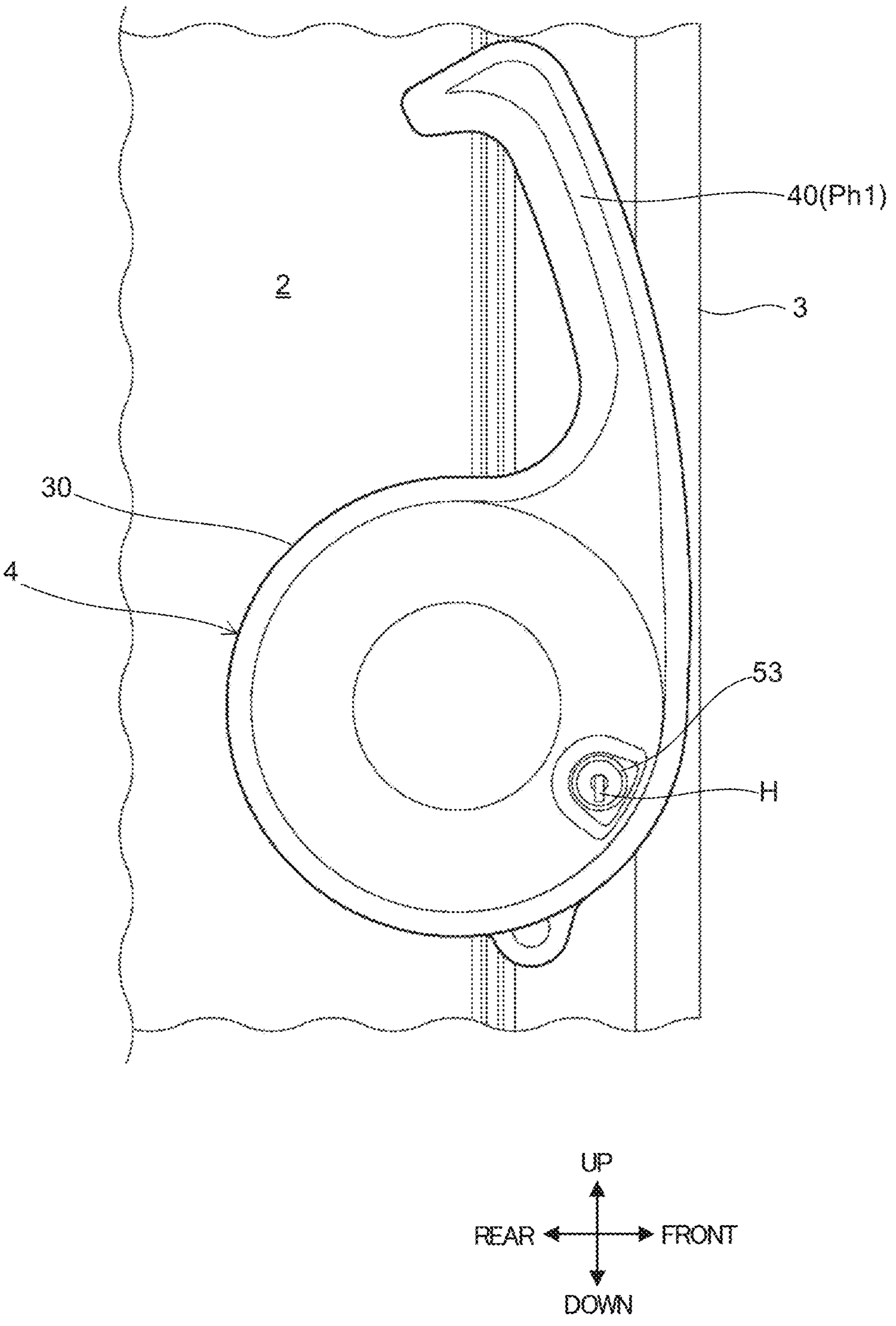
FIG. 2 is a side view of a handle.

As illustrated in FIGS. 1 and 2, handle 4 is attached to the left surface of door 3. Handle 4 is a member for easily opening and closing door 3, and is operated by the user when opening or closing door 3. When operated in the state where door 3 is in a closed state, handle 4 restricts and allows the operation of changing the state of door 3 from the closed state to the open state. As illustrated in FIGS. 2 to 8, handle 4 includes box base 10, door base 20, casing 30, and holding part 40. Box base 10, door base 20 and casing 30 are provided separately from each other.

Figure 3:
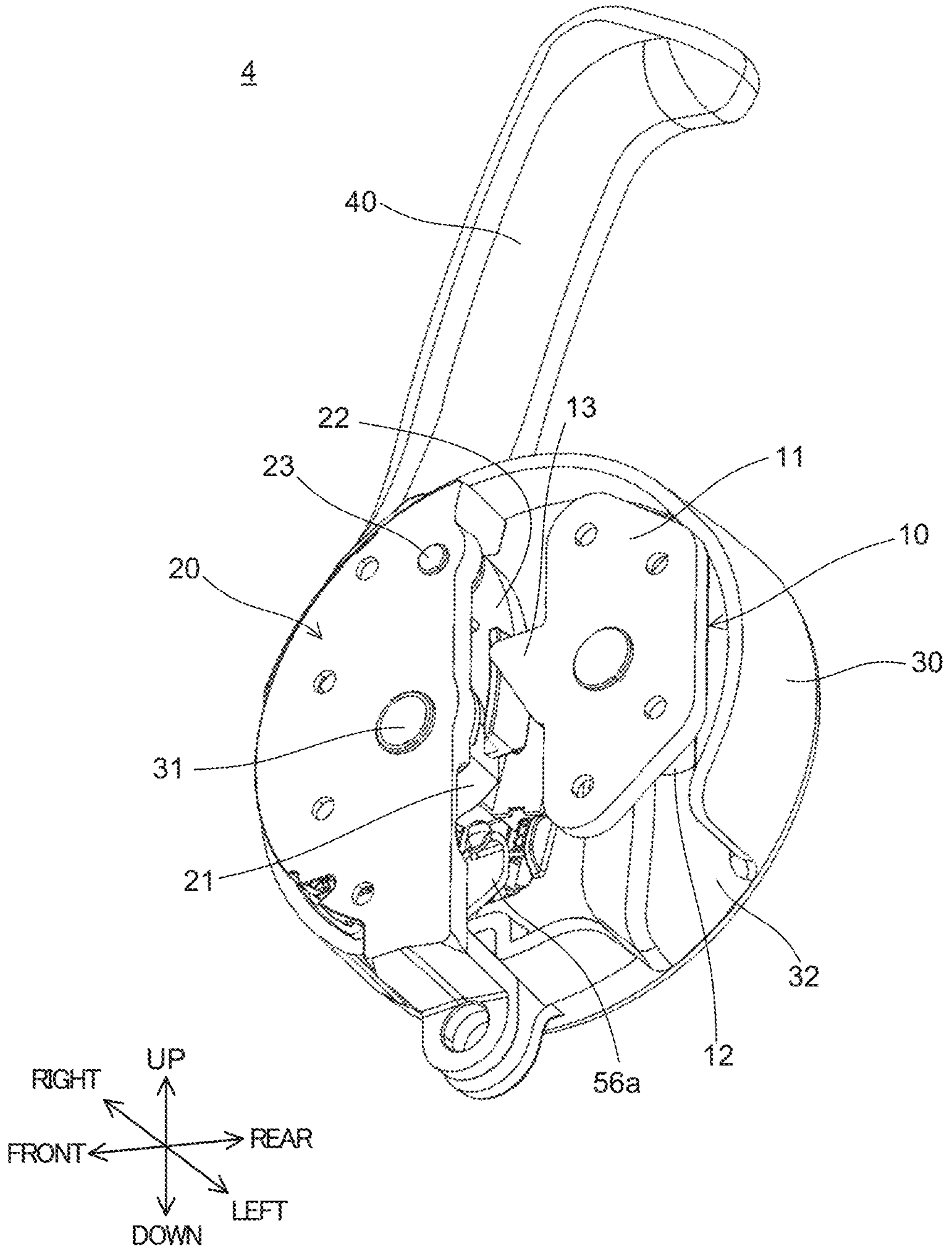
FIG. 3 is a perspective view of the handle.
Figure 6:
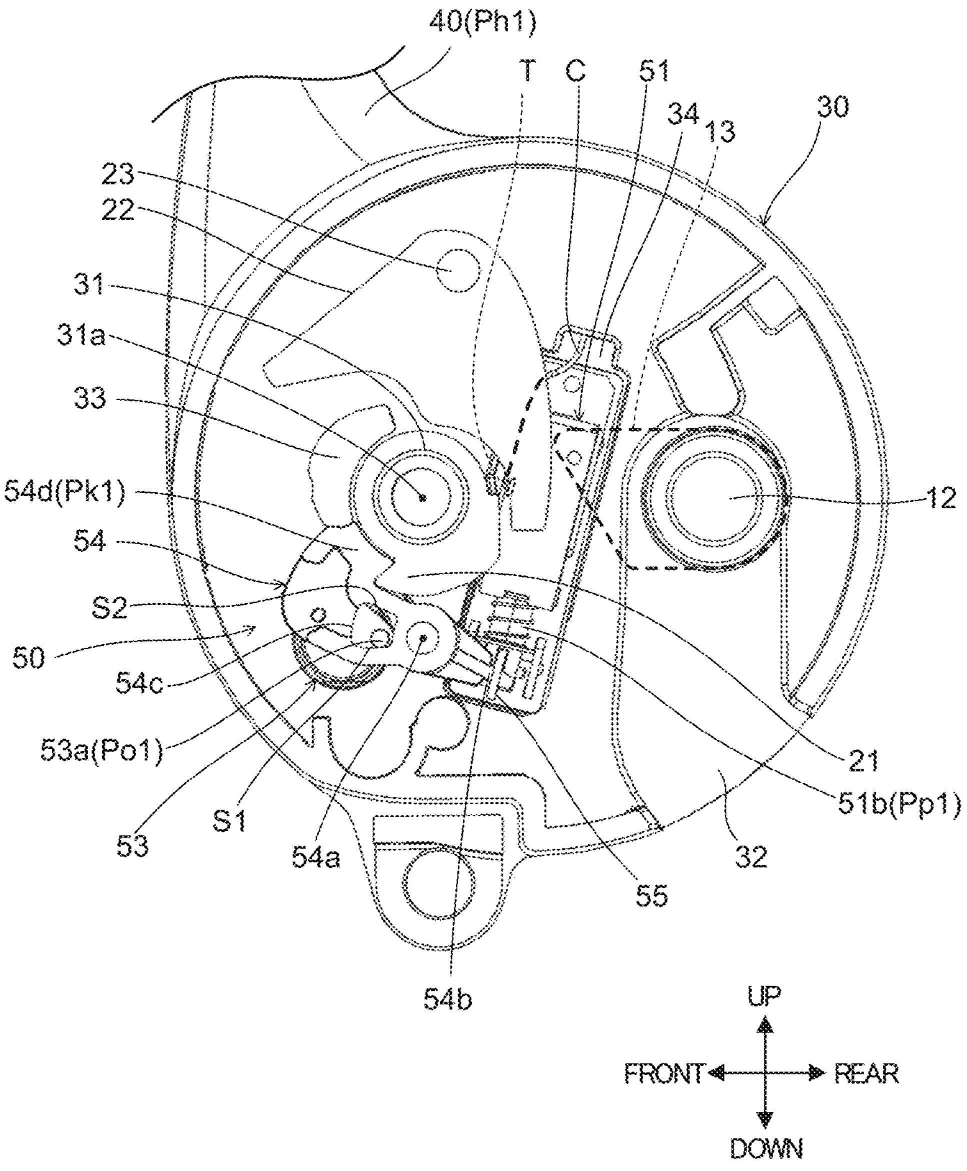
FIG. 6 is a sectional view of the handle illustrating an internal structure of the handle.

Box base 10 is fixed to a position near door 3 in the left surface of box 2. As illustrated in FIGS. 3 and 6, box base 10 includes box fixing part 11, engage pin 12, and protrusion 13. Note that protrusion 13 illustrated in FIGS. 6 to 10 is illustrated with a broken line.

Box fixing part 11 is formed in a plate shape, and fixed to box 2. Engage pin 12 is formed in a columnar shape extending leftward along the left-right direction from the left plate surface of box fixing part 11. Engage pin 12 engages with casing 30 (details are described later) when door 3 is in a closed state. Protrusion 13 protrudes frontward from the front surface of box fixing part 11. Protrusion 13 presses restriction plate 22 described later when door 3 is in a closed state (details are described later).

Door base 20 is formed in a plate shape, and fixed to the left surface of door 3. Door base 20 is attached to door 3 so as to be aligned with box base 10 in the front-rear direction when door 3 is in a closed state. Stopper 21 protruding leftward from the left plate surface is formed in door base 20 (FIGS. 3 and 6 to 8). Details of stopper 21 are described later.

Figure 4:
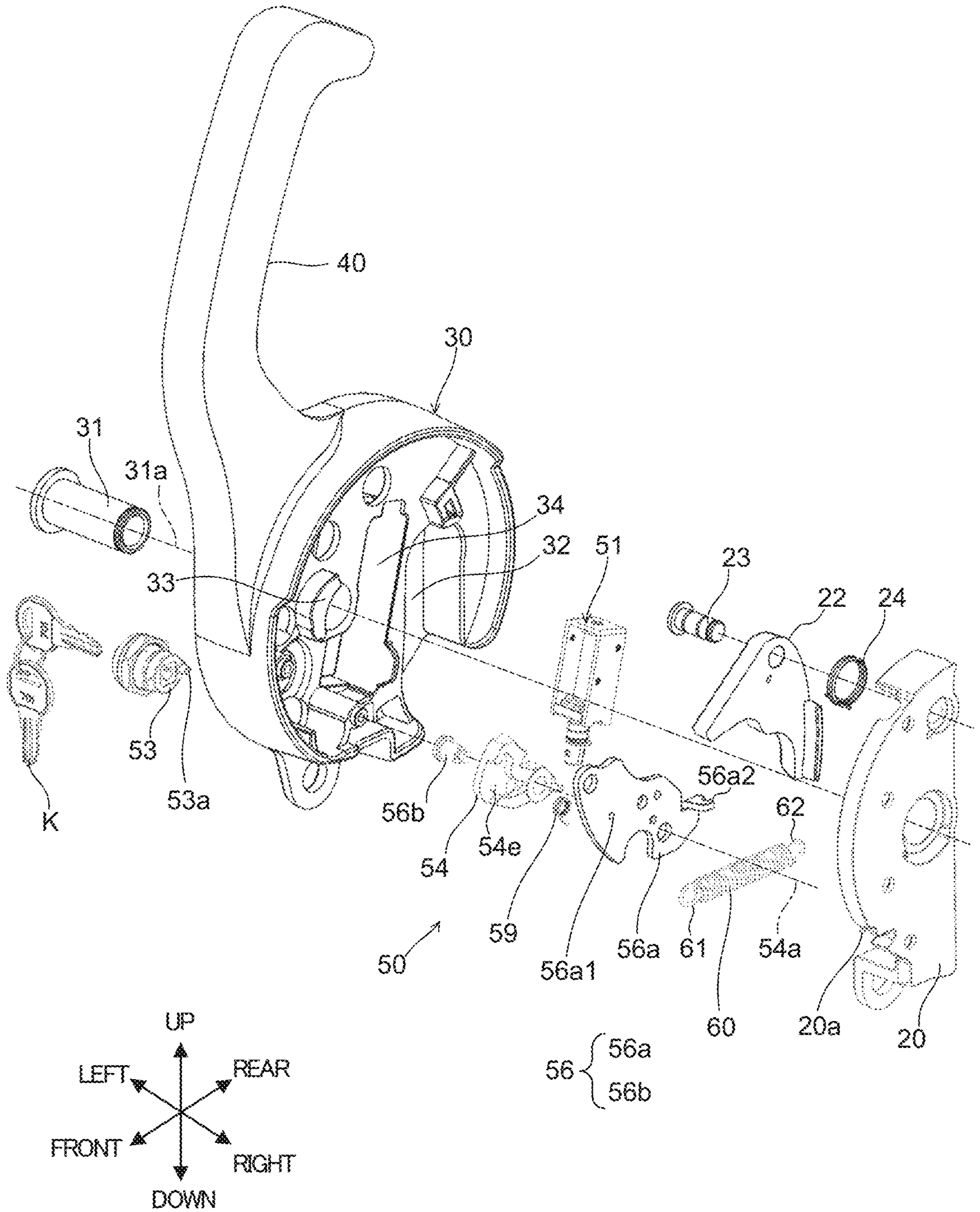
FIG. 4 is an exploded perspective view of the handle.

In door base 20, casing 30 is attached so as to be rotatable clockwise and counterclockwise in FIG. 2. In addition, restriction plate 22 is disposed in door base 20 (FIGS. 3 and 4). Details of restriction plate 22 are described later.

Casing 30 is formed in a hollow columnar shape that is open on the right side. As illustrated in FIGS. 3 and 4, base shaft member 31 is attached to casing 30, and base shaft member 31 is extended through the left side wall of casing 30 and attached to door base 20. Casing 30 rotates around second rotation axis 31*a* with respect to door base 20. Second rotation axis 31*a* is the central axis of base shaft member 31.

Casing 30 and holding part 40 are formed integrally with each other. Holding part 40 is formed in a rod shape extending from the outer peripheral surface of casing 30. Holding part 40 is grabbed when the user operates handle 4. Casing 30 is attached to door 3 such that holding part 40 is located at close position Ph1 along the up-down direction when door 3 is in a closed state (FIG. 2). In addition, engaged portion 32 and protrusion 33 are formed in casing 30.

Engaged portion 32 is formed in a groove shape with the first end opening to the outer peripheral surface of casing 30 at the inner surface of the left side wall of casing 30. Engaged portion 32 is formed to extend approximately along the up-down direction when holding part 40 is located at close position Ph1 (FIG. 6). In addition, when door 3 is in a closed state and holding part 40 is located at close position Ph1, engage pin 12 engages with the second end portion of engaged portion 32 (FIG. 6). In this manner, when the user tries to open door 3 with holding part 40 still located at close position Ph1, door 3 is restricted from opening by engage pin 12 in contact with the side surface of engaged portion 32.

Figure 8:
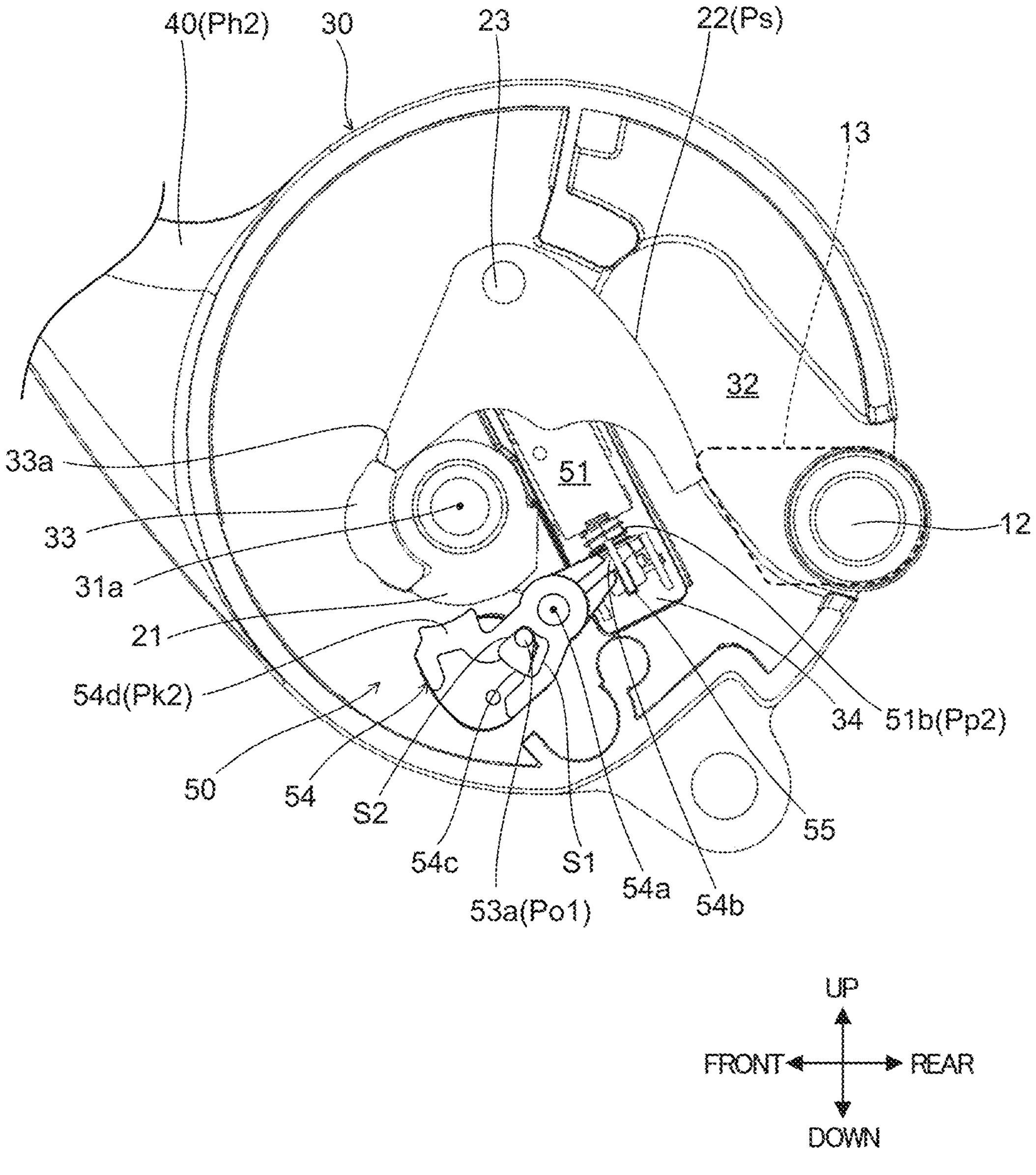
FIG. 8 is a sectional view of the handle illustrating an internal structure of the handle.

When opening door 3, the user grabs holding part 40 to operate holding part 40 (i.e., pull it to the near side) such that casing 30 rotates clockwise in FIG. 2 (counterclockwise in FIG. 6). In this manner, holding part 40 moves from close position Ph1 (FIG. 6) to open position Ph2 (FIG. 8). When casing 30 rotates, engaged portion 32 rotates and as a result the side surface of engaged portion 32 presses engage pin 12.

When holding part 40 is located at open position Ph2, pressed engage pin 12 relatively moves to the vicinity of the opening of engaged portion 32 with respect to casing 30, and the first end of engaged portion 32 opens to the rear side (FIG. 8). In this manner, when the user opens door 3, engage pin 12 is not brought into contact with the side surface of engaged portion 32, and thus door 3 is allowed to open. Note that when holding part 40 is located at open position Ph2, door 3 opens by the distance of the movement of engage pin 12 in the front-rear direction.

Protrusion 33 is formed to protrude rightward from the inner surface of the left side wall of casing 30 along the left-right direction. Details of protrusion 33 are described later.

In addition, locking device 50 is housed in casing 30. Locking device 50 restricts and allows the operation of handle 4. The operation of handle 4 restricted and allowed by locking device 50 is the operation in which the user moves holding part 40 from close position Ph1 to open position Ph2.

When locking device 50 is locked, the operation of handle 4 is restricted. That is, when locking device 50 is locked, the user cannot move holding part 40 from close position Ph1 to open position Ph2. On the other hand, when locking device 50 is unlocked, the operation of handle 4 is allowed. That is, when locking device 50 is unlocked, the user can move holding part 40 from close position Ph1 to open position Ph2.

Locking device 50 includes electromagnetic actuator 51, control part 52 (FIG. 1), manual rotation member 53, lever member 54, coupling member 55 (FIG. 5), and holding member 56. In addition, the above-described stopper 21 and protrusion 33 also make up locking device 50. Coupling member 55 is an example of "moving member".

Figure 5:
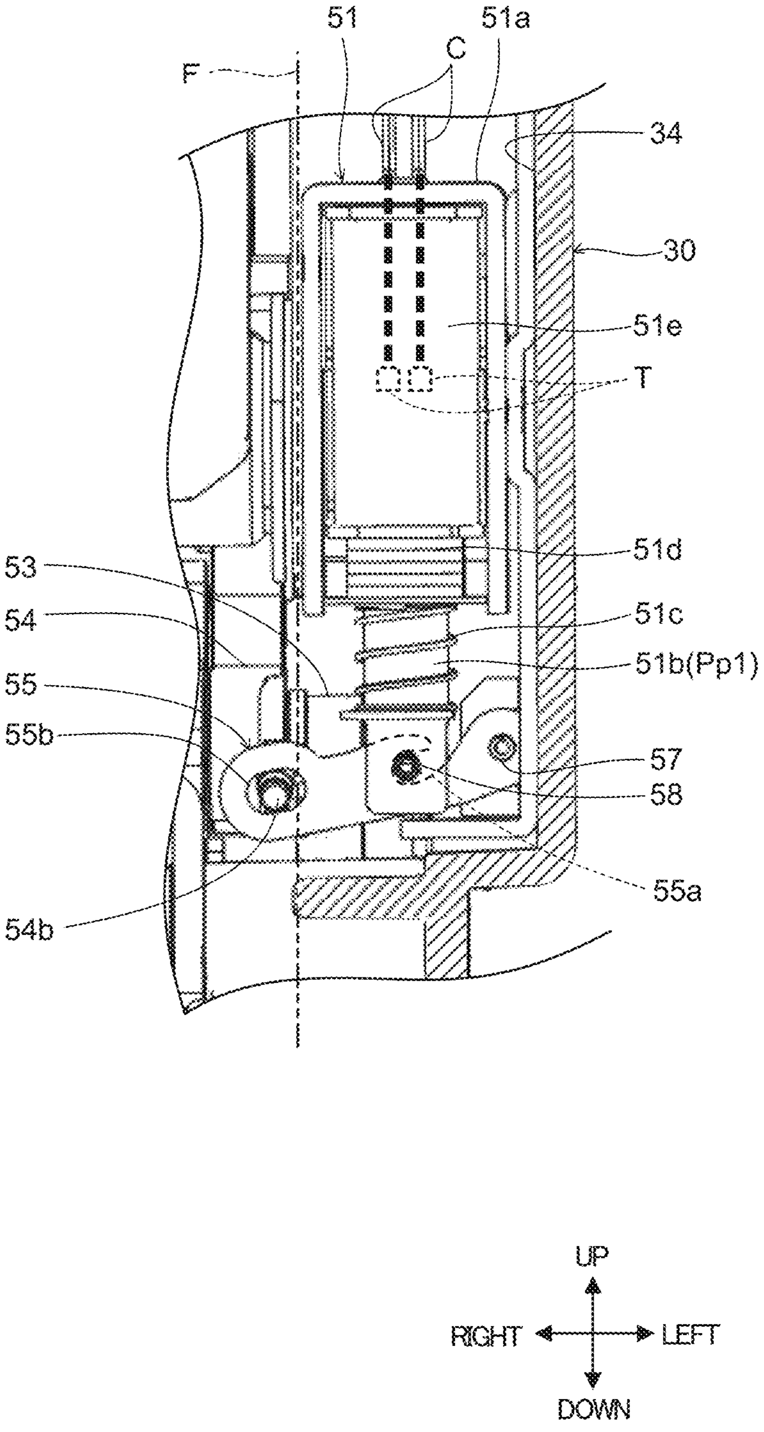
FIG. 5 is a partially enlarged sectional view of the handle for describing an electromagnetic actuator.

Electromagnetic actuator 51 is composed of a self-retaining solenoid. As illustrated in FIG. 5, electromagnetic actuator 51 is disposed in recess 34 formed in the inner surface of the left side wall of casing 30. Electromagnetic actuator 51 includes frame 51*a*, movable iron core 51*b*, first spring 51*c*, permanent magnet 51*d*, and magnetic coil 51*e*.

Frame 51*a* is formed in a cuboid shape, and houses permanent magnet 51*d* and magnetic coil 51*e*. Movable iron core 51*b* is formed in a columnar shape, and held so as to be movable back and forth along the axial direction with respect to frame 51*a*. The first end portion (in FIG. 5, the upper end portion) of movable iron core 51*b* is housed in frame 51*a*. The second end portion (in FIG. 5, the lower end portion) of movable iron core 51*b* is exposed to the outside. Movable iron core 51*b* moves back and forth along the axial direction (in FIG. 6, the approximately up-down direction).

First spring 51*c* is a coil spring. First spring 51*c* biases movable iron core 51*b* in the advancing direction from frame 51*a* (in FIGS. 5 to 7, the downward direction). Permanent magnet 51*d* holds movable iron core 51*b* with a magnetic force.

Magnetic coil 51*e* is a coil that generates a magnetic flux when energized. Magnetic coil 51*e* is composed of a conductive wire wound around the first end portion of movable iron core 51*b* in frame 51*a*. The both end portions of the conductive wire making up magnetic coil 51*e* is connected to electric wire C through terminal T. Magnetic coil 51*e* receives power from terminal T through electric wire C. Terminal T is an example of "power receiving part".

As illustrated in FIGS. 5 and 6, terminal T is disposed at a center portion in the front surface of magnetic coil 51*e*. In addition, terminal T is disposed near the second rotation axis 31*a* than the second end portion of movable iron core 51*b* (FIG. 6). Attaching portion 54*b* of lever member 54 described later is attached to the second end portion of movable iron core 51*b* through coupling member 55. Specifically, magnetic coil 51*e* is disposed near second rotation axis 31*a* than attaching portion 54*b*. More specifically, magnetic coil 51*e* is disposed near second rotation axis 31*a*.

Now, an operation of electromagnetic actuator 51 is described. In electromagnetic actuator 51 illustrated in FIG. 6, magnetic coil 51*e* is not energized, movable iron core 51*b* is located at advanced position Pp1 advanced from frame 51*a*, and the position of movable iron core 51*b* is kept at advanced position Pp1 with the magnetic force of permanent magnet 51*d*.

In electromagnetic actuator 51 illustrated in FIG. 6, when magnetic coil 51*e* is energized in the predetermined direction, magnetic coil 51*e* is excited and as a result the attraction force for attracting movable iron core 51*b* is generated. In this manner, movable iron core 51*b* with the attraction force retracts against the magnetic force of permanent magnet 51*d* and the biasing force of first spring 51*c*, and is set at retraction position Pp2 illustrated in FIG. 7. When the energization of magnetic coil 51*e* is stopped, movable iron core 51*b* is held at retraction position Pp2 with the magnetic force of permanent magnet 51*d*.

Figure 7:
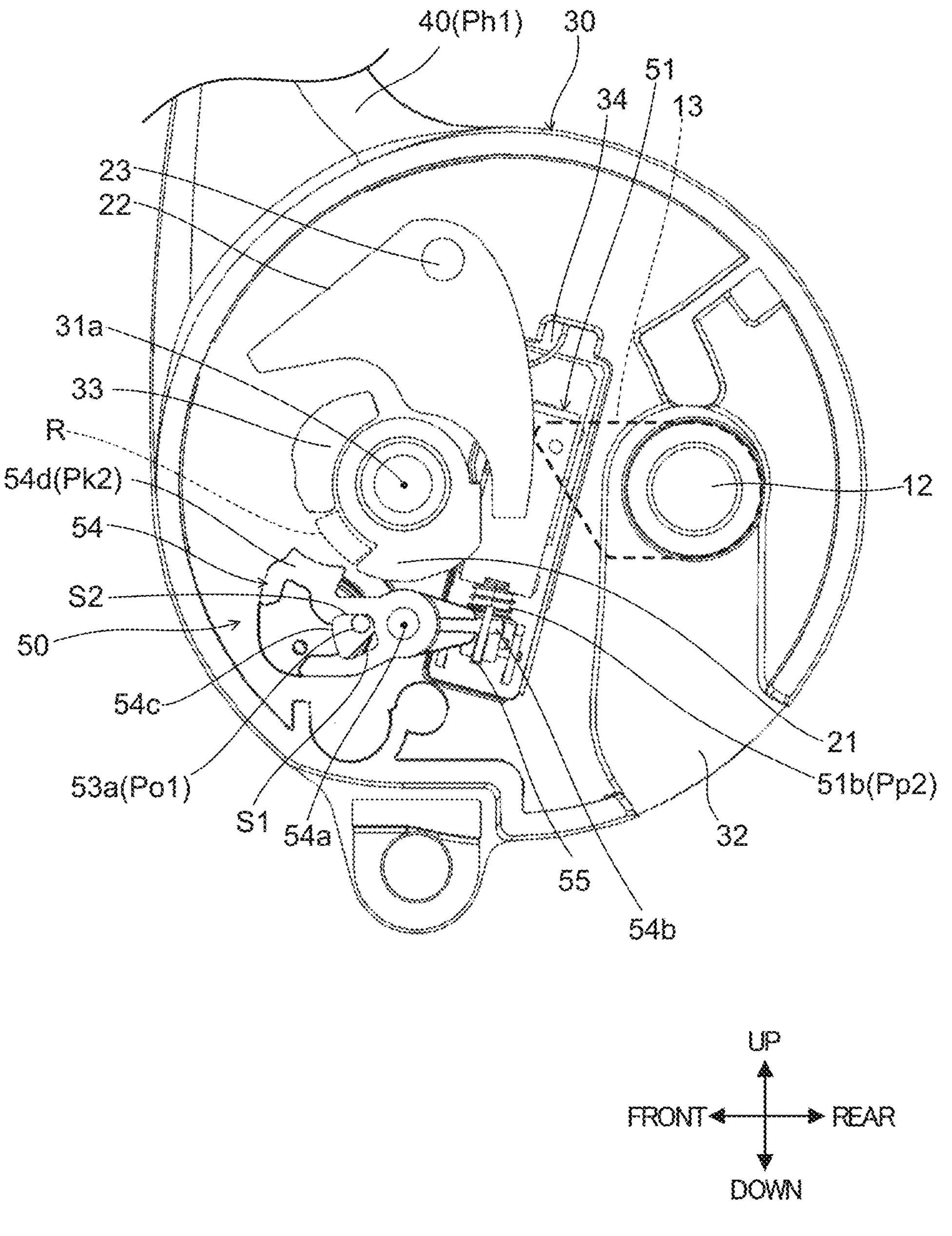
FIG. 7 is a sectional view of the handle illustrating an internal structure of the handle.

On the other hand, in electromagnetic actuator 51 illustrated in FIG. 7, when magnetic coil 51*e* is energized in a direction opposite to a predetermined direction, a magnetic flux in the direction opposite to the direction in which magnetic coil 51*e* is energized in the predetermined direction is generated. In this manner, the magnetic force of permanent magnet 51*d* is canceled, and as a result movable iron core 51*b* advances against the magnetic force of permanent magnet 51*d* with the biasing force of first spring 51*c* so as to be located at advanced position Pp1 illustrated in FIG. 6. When the energization of magnetic coil 51*e* is stopped, movable iron core 51*b* is held at advanced position Pp1 by the magnetic force of permanent magnet 51*d*. In the following description, regarding the energization of magnetic coil 51*e*, the predetermined direction is referred to as advancing direction and the direction opposite to the predetermined direction as retraction direction.

Control part 52 is housed in door 3 (FIG. 1). Control part 52 is electrically connected to magnetic coil 51*e* of electromagnetic actuator 51 through electric wire C (FIG. 5) so as to control electromagnetic actuator 51. When receiving a locking signal for restricting the operation of handle 4, control part 52 energizes magnetic coil 51*e* in the advancing direction. When receiving an unlocking signal for allowing the operation of handle 4, control part 52 energizes magnetic coil 51*e* in the retraction direction. The signal received by control part 52 is output from a control device (not illustrated in the drawing) that centrally controls refrigeration device 1.

The control device outputs the locking signal to control part 52 when a lock switch (not illustrated in the drawing) displayed on operation panel 3*a* that restricts the operation of handle 4 is pressed by the user. On the other hand, when an unlocking switch (not illustrated in the drawing) that allows the operation of handle 4 disposed in operation panel 3*a* is pressed by the user, the control device outputs the unlocking signal to control part 52. Note that control part 52 may be configured integrally with, or separately from, the control device.

As illustrated in FIG. 4, manual rotation member 53 is formed in a columnar shape extending along the left-right direction. Manual rotation member 53 is disposed in casing 30 such that key K can be inserted to key hole H (FIG. 2) provided in the left surface from the outside of handle 4. When key K is inserted to key hole H and key K is manually turned, manual rotation member 53 rotates around the central axis of manual rotation member 53. In addition, manual rotation member 53 is provided with pressure member 53*a*.

Pressure member 53*a* is provided in a columnar shape extending rightward along the left-right direction from the right surface of manual rotation member 53. Pressure member 53*a* rotates integrally with manual rotation member 53. Pressure member 53*a* is located at reference position Po1 illustrated in FIGS. 6 and 7 in the state where key K is not inserted in key hole H. Manual rotation member 53 is configured such that key K can be inserted to or removed from key hole H when pressure member 53*a* is located at reference position Po1.

Figure 9:
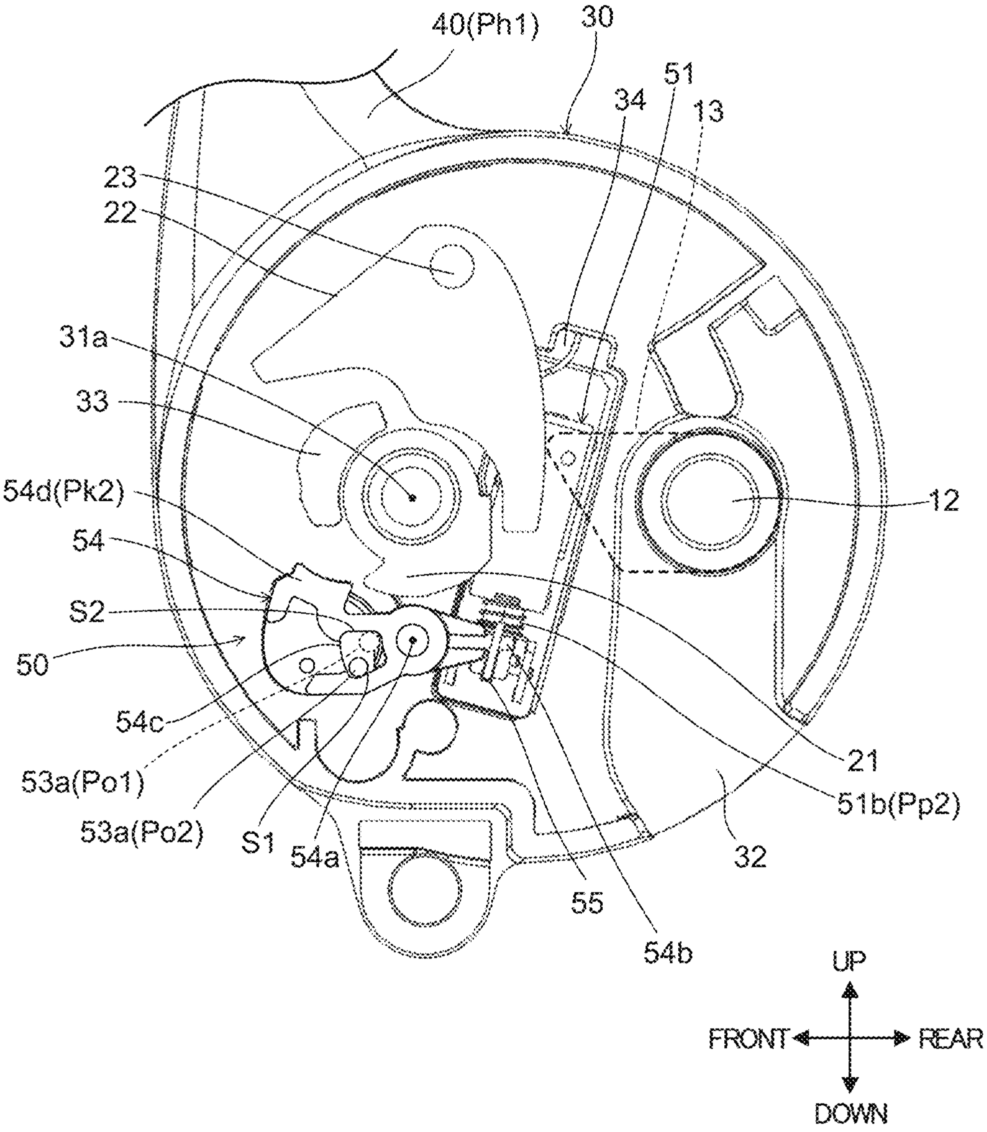
FIG. 9 is a sectional view of the handle illustrating an internal structure of the handle.

When pressure member 53*a* is located at reference position Po1 and key K is inserted to key hole H and rotated clockwise in FIG. 6, pressure member 53*a* is rotated clockwise around the central axis of manual rotation member 53 and set at drawing position Po2 (FIG. 9). The operation of key K in which pressure member 53*a* moves from reference position Po1 to drawing position Po2 is referred to as unlocking operation.

Further, when key K is rotated counterclockwise in FIG. 9, pressure member 53*a* rotates clockwise from drawing position Po2 around the central axis of manual rotation member 53 and returns to reference position Po1. In this manner, pressure member 53*a* makes a first back-and-forth movement of moving from reference position Po1 to drawing position Po2 and returning from drawing position Po2 to reference position Po1 in accordance with the unlocking operation of key K.

Figure 10:
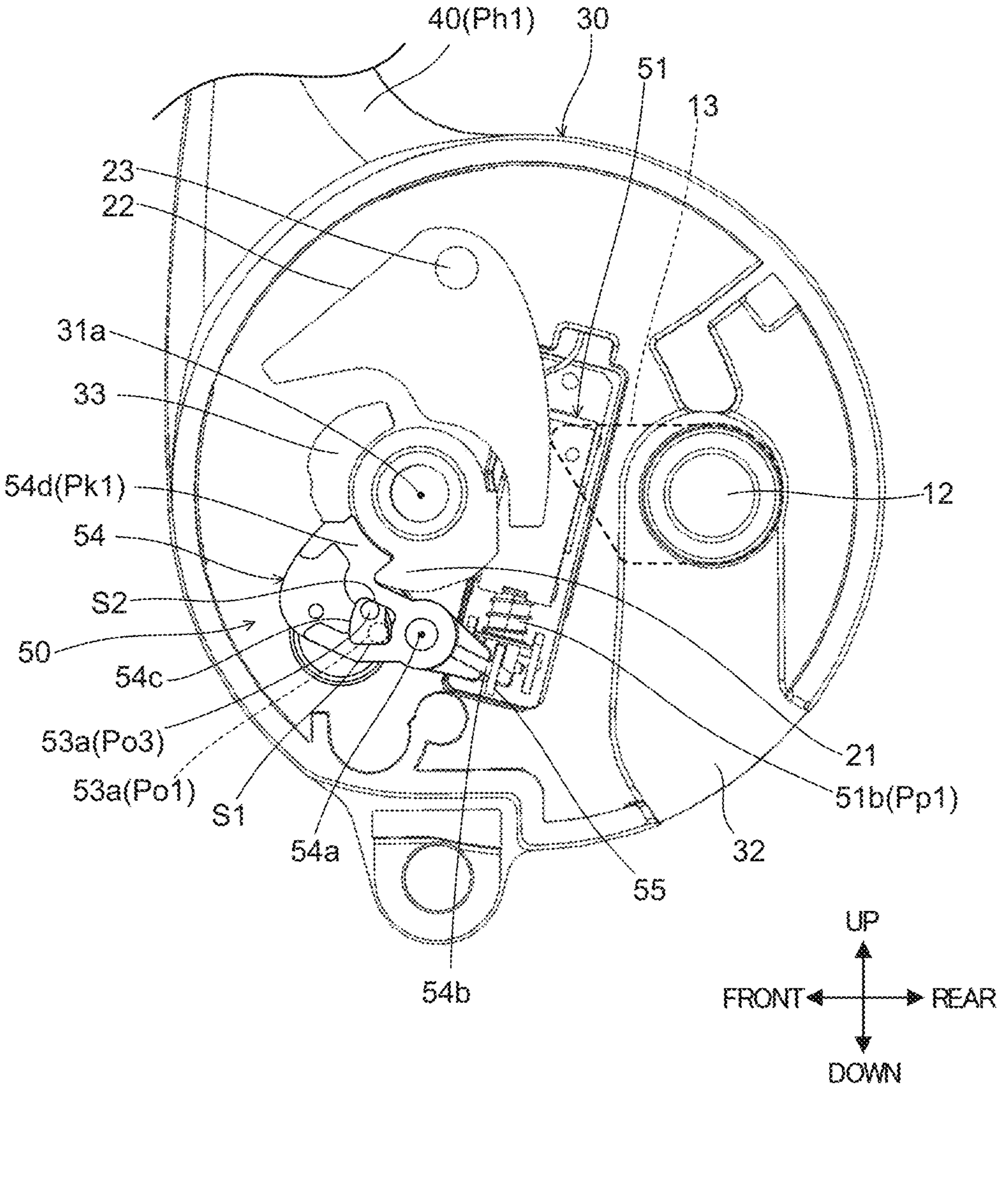
FIG. 10 is a sectional view of the handle illustrating an internal structure of the handle.

In addition, when key K is inserted to key hole H and rotated counterclockwise in FIG. 6 in the state where pressure member 53*a* is located at reference position Po1, pressure member 53*a* is rotated counterclockwise around the central axis of manual rotation member 53 and set at push position Po3 (FIG. 10). The operation of key K in which pressure member 53*a* moves from reference position Po1 to push position Po3 is referred to as locking operation.

Further, when key K is rotated clockwise in FIG. 10, pressure member 53*a* rotates clockwise from push position Po3 around the central axis of manual rotation member 53 and returns to reference position Po1. In this manner, pressure member 53*a* makes a second back-and-forth movement of moving from reference position Po1 to push position Po3 and returning from push position Po3 to reference position Po1 in accordance with the locking operation of key K.

Holding member 56 rotatably holds lever member 54. As illustrated in FIG. 4, holding member 56 includes holding plate 56*a* and holding shaft member 56*b*, and holding plate 56*a* is formed in a plate shape and fixed to casing 30. Holding shaft member 56*b* is formed in a columnar shape, and disposed to extend leftward along the left-right direction from the left plate surface of holding plate 56*a*.

Lever member 54 is formed in an L-shape in side view, and is disposed between the left side wall of casing 30 and holding plate 56*a* (FIG. 4). In addition, lever member 54 is fit with holding shaft member 56*b* so as to be rotatable (swayable) with respect to holding shaft member 56*b*. First rotation axis 54*a* serving as the rotational center of lever member 54 is coaxial with the central axis of holding shaft member 56*b*.

In addition, as illustrated in FIG. 5, lever member 54 and electromagnetic actuator 51 are disposed along plane F orthogonal to second rotation axis 31*a* (see FIG. 4) with plane F orthogonal to second rotation axis 31*a* sandwiched therebetween. That is, assuming that a plurality of virtual layers stacked in the direction along second rotation axis 31*a* is used, lever member 54 and electromagnetic actuator 51 are disposed in layers different from each other. Thus, the arrangement of lever member 54, electromagnetic actuator 51 and other members in casing 30 can be optimized and casing 30 can be downsized. Note that more specifically, lever member 54 is disposed on the right side than electromagnetic actuator 51 (FIGS. 5 and 6).

As illustrated in FIG. 6, lever member 54 includes attaching portion 54*b*, hole 54*c*, and restriction part 54*d*.

Attaching portion 54*b* is formed in a rod shape at an end portion on the rear side than first rotation axis 54*a* in lever member 54. The second end portion of movable iron core 51*b* that moves in accordance with the operation of electromagnetic actuator 51 is attached to attaching portion 54*b*. More specifically, attaching portion 54*b* is attached to movable iron core 51*b* through coupling member 55 (FIG. 5). In accordance with the back-and-forth movement of movable iron core 51*b*, attaching portion 54*b* and in turn lever member 54 rotate around first rotation axis 54*a* (details are described later).

Restriction part 54*d* is provided in lever member 54 to protrude upward at an end portion on the front side than first rotation axis 54*a*. That is, restriction part 54*d* and attaching portion 54*b* are disposed on the opposite sides with first rotation axis 54*a* therebetween. In this manner, by adjusting the distance between first rotation axis 54*a* and attaching portion 54*b* and the distance between first rotation axis 54*a* and restriction part 54*d*, the movement amount of movable iron core 51*b* and in turn the movement amount of restriction part 54*d* in accordance with the movement amount of attaching portion 54*b* can be appropriately set.

When lever member 54 rotates around first rotation axis 54*a*, restriction part 54*d* moves between lock position Pk1 and unlock position Pk2.

As illustrated in FIG. 6, lock position Pk1 is a position where restriction part 54*d* is fit to region (hereinafter referred to as restriction region) R formed between protrusion 33 and stopper 21 in the rotational direction around second rotation axis 31*a* when holding part 40 is located at close position Ph1. Restriction region R is the region indicated with the broken line in FIG. 7.

Stopper 21 is located on the lower side of base shaft member 31, and is formed integrally with door base 20 fixed to door 3 as described above. Thus, stopper 21 does not move from the position illustrated in FIG. 6 even when holding part 40 is operated and casing 30 is rotated.

On the other hand, protrusion 33 is located on the front side of base shaft member 31 and formed integrally with casing 30 as described above. Thus, protrusion 33 rotates integrally with casing 30 when holding part 40 is operated. When holding part 40 is located at close position Ph1 illustrated in FIG. 6, protrusion 33 is located at a position separated from stopper 21 in the rotational direction around second rotation axis 31*a* with restriction region R therebetween. When holding part 40 is rotated from close position Ph1 and set at open position Ph2, protrusion 33 is rotated clockwise around second rotation axis 31*a* of FIG. 6 and set at a position where it makes contact with stopper 21 and no restriction region R is formed (FIG. 8).

When restriction part 54*d* is located at lock position Pk1 where it is fit to restriction region R (FIG. 6), restriction part 54*d* is sandwiched between protrusion 33 and stopper 21 in the rotational direction around second rotation axis 31*a* and brought into contact with both protrusion 33 and stopper 21. In this manner, the rotation of protrusion 33 around second rotation axis 31*a* and in turn the rotation of holding part 40 from close position Ph1 to open position Ph2 are restricted. That is, when restriction part 54*d* is located at lock position Pk1, locking device 50 is in a locked state.

As illustrated in FIG. 7, unlock position Pk2 is a position where restriction part 54*d* is out of restriction region R that is formed when handle 4 is located at close position Ph1. When restriction part 54*d* is located at unlock position Pk2, restriction part 54*d* does not inhibit the rotation of protrusion 33 around second rotation axis 31*a*. In this manner, the rotation of protrusion 33 around second rotation axis 31*a* and in turn the rotation of holding part 40 from close position Ph1 to open position Ph2 are allowed. That is, when restriction part 54*d* is located at unlock position Pk2, locking device 50 is in an unlocked state.

Hole 54*c* is formed in an approximately rectangular shape. Hole 54*c* is a hole extending through in the left-right direction on the front side than first rotation axis 54*a* in lever member 54. That is, hole 54*c* and attaching portion 54*b* are disposed on the opposite sides with first rotation axis 54*a* therebetween. In this manner, by adjusting the distance between first rotation axis 54*a* and attaching portion 54*b* and the distance between first rotation axis Ma and hole Mc, it is possible to appropriately set the movement amount of hole Mc in accordance with the movement amount of movable iron core 51*b* and in turn the movement amount of attaching portion 54*b*.

Pressure member 53*a* is disposed in hole 54*c*. Pressure member 53*a* makes the first back-and-forth movement and the second back-and-forth movement in hole 54*c* as described above.

As illustrated in FIG. 6, when restriction part 54*d* is located at lock position Pk1, pressure member 53*a* presses first portion S1, which is a part of the inner peripheral surface of hole 54*c*, through the movement of pressure member 53*a* from reference position Po1 (FIG. 6) to drawing position Po2 (FIG. 9) (i.e., the forward movement of the first back-and-forth movement). First portion S1 is a lower portion in the inner peripheral surface of hole 54*c*.

On the other hand, as illustrated in FIG. 7, when restriction part 54*d* is located at unlock position Pk2, pressure member 53*a* presses second portion S2, which is a part of the inner peripheral surface of hole 54*c*, through the movement of pressure member 53*a* from reference position Po1 (FIG. 7) to push position Po3 (FIG. 10) (i.e., the forward movement of the second back-and-forth movement). Second portion S2 is an upper portion in the inner peripheral surface of hole 54*c*.

In addition, hole 54*c* is formed such that the distance between first portion S1 and second portion S2 is greater than the outer diameter of pressure member 53*a*. More specifically, as illustrated in FIG. 10, hole 54*c* is formed such that pressure member 53*a* does not press first portion S1 and second portion S2 even when pressure member 53*a* makes the second back-and-forth movement between reference position Po1 and push position Po3 in the case where restriction part 54*d* is located at lock position Pk1.

Further, as illustrated in FIG. 9, hole 54*c* is formed such that pressure member 53*a* does not press first portion S1 and second portion S2 even when pressure member 53*a* makes the first back-and-forth movement between reference position Po1 and drawing position Po2 in the case where restriction part 54*d* is located at unlock position Pk2.

In addition, hole Mc is formed such that pressure member 53*a* does not press first portion S1 and second portion S2 even when lever member 54 is rotated through the operation of electromagnetic actuator 51 as described later in the case where pressure member 53*a* is located at reference position Po1 (FIGS. 6 and 7).

Coupling member 55 is a member provided separately from electromagnetic actuator 51. Coupling member 55 couples attaching portion 54*b* and movable iron core 51*b*. As illustrated in FIG. 5, coupling member 55 is formed in a plate shape extending along the approximately left-right direction. Coupling member 55 is rotatably fit to coupling shaft member 57 disposed at casing 30 so as to extend along the approximately front-rear direction at one end side (left end side). Groove part 55*a* and long hole 55*b* are formed in coupling member 55.

Groove part 55*a* is formed in a center portion of coupling member 55. Movement shaft member 58 extending through the second end portion of movable iron core 51*b* along approximately front-rear direction is engaged with groove part 55*a*. Movement shaft member 58 moves back and forth along the axial direction of movable iron core 51*b* in accordance with the back-and-forth movement of movable iron core 51*b*. Groove part 55*a* that engages with movable iron core 51*b* and in turn coupling member 55 rotate around coupling shaft member 57 in accordance with the movement of movement shaft member 58.

Long hole 55*b* is formed on the other end side (right end side) of coupling member 55. Attaching portion 54*b* of lever member 54 is engaged with long hole 55*b*. When coupling member 55 rotates around coupling shaft member 57 in accordance with the back-and-forth movement of movable iron core 51*b* as described above, long hole 55*b* rotates around coupling shaft member 57. In this manner, when attaching portion 54*b* engaged with long hole 55*b* moves, lever member 54 rotates around first rotation axis 54*a*.

With the above-described configuration of coupling member 55, coupling member 55 has a fulcrum on one end side where coupling shaft member 57 makes contact, and an operation point on the other end side where attaching portion 54*b* makes contact. In addition, coupling member 55 includes a force point where the force of electromagnetic actuator 51 is applied through movement shaft member 58 between the fulcrum and the operation point where attaching portion 54*b* makes contact.

Since coupling member 55 is engaged with movement shaft member 58 between coupling shaft member 57 and long hole 55*b* where attaching portion 54*b* is attached, the movement amount of long hole 55*b* is greater than the movement amount of movable iron core 51*b*. Thus, it is possible to make the movement amount of attaching portion 54*b* greater than the movement amount of movable iron core 51*b*. Thus, the movement amount of movable iron core 51*b* can be suppressed and electromagnetic actuator 51 can be downsized.

In addition, as illustrated in FIG. 4, locking device 50 further includes third spring 59. Third spring 59 is a torsion spring. Third spring 59 is attached by using lever hole 54*e* and plate hole 56*a*1 between lever member 54 and holding plate 56*a*. Third spring 59 is an example of "elastic member".

Figure 11:
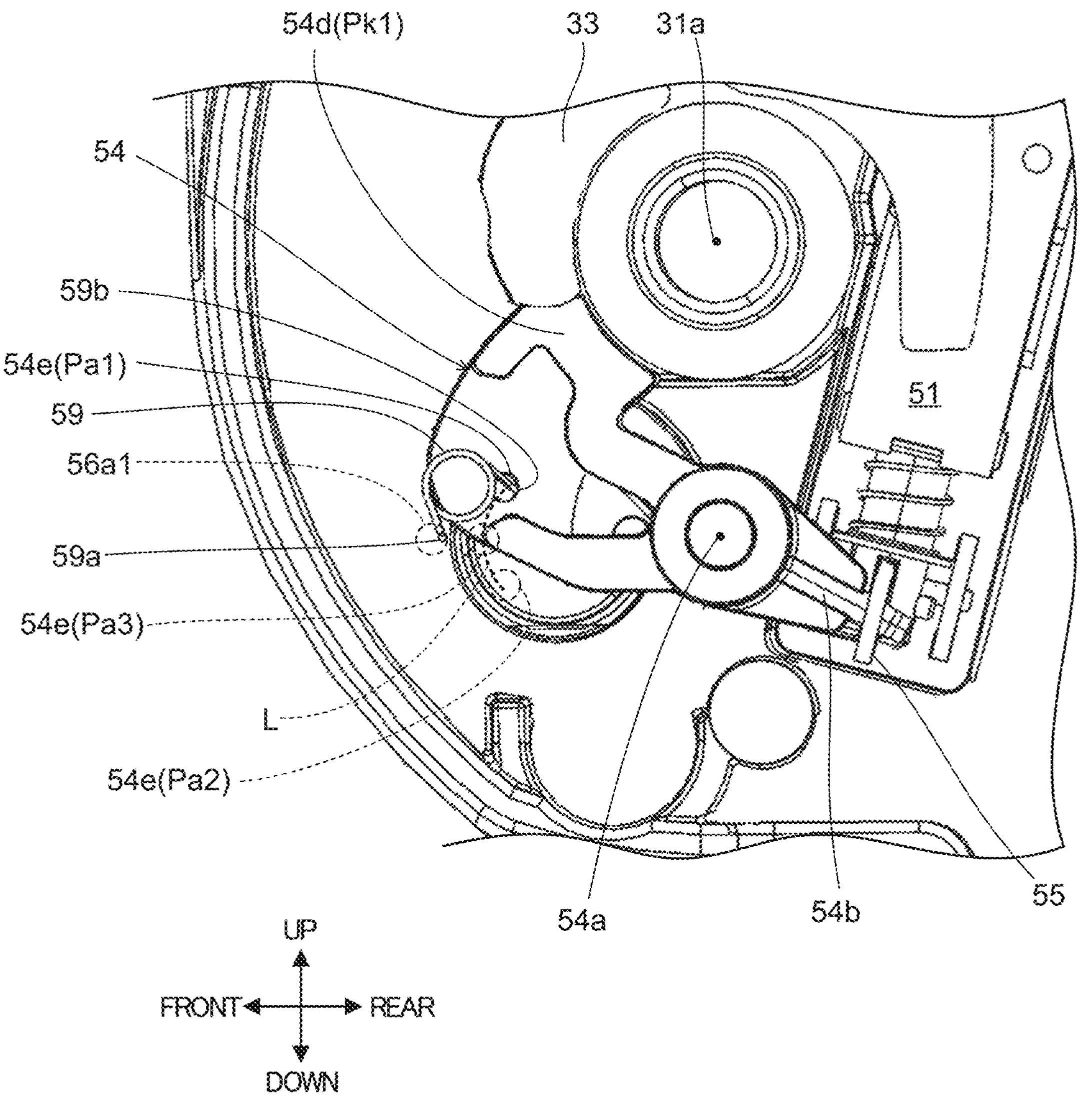
FIG. 11 is a partially enlarged sectional view of the handle for describing a third spring.
Figure 12:
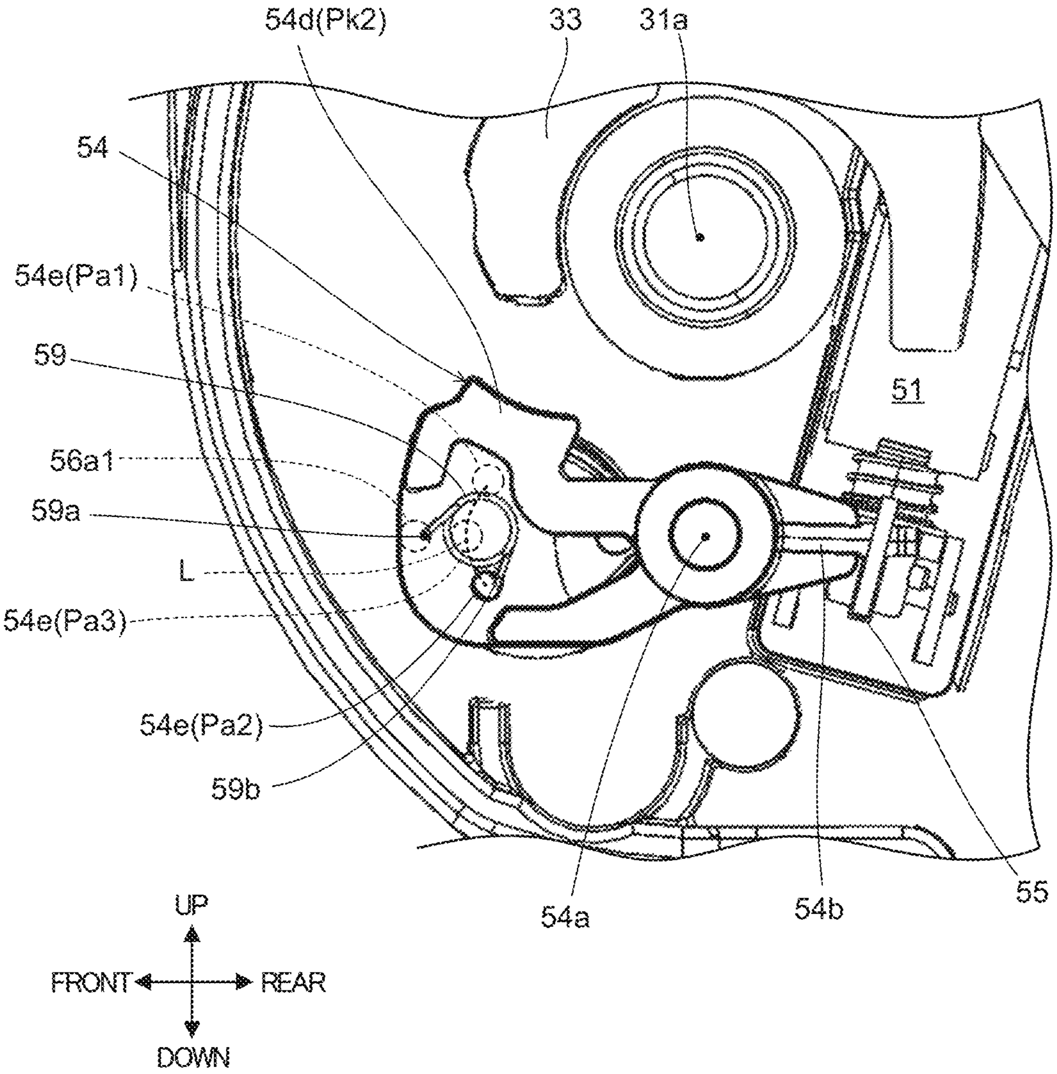
FIG. 12 is a partially enlarged sectional view of the handle for describing a third spring.

As illustrated in FIGS. 11 and 12, first end portion 59*a* of third spring 59 is attached to plate hole 56*a*1 formed in holding plate 56*a*. Holding plate 56*a* is fixed to casing 30, and therefore the position of plate hole 56*a*1 and in turn the position of first end portion 59*a* of third spring 59 are fixed with respect to casing 30.

On the other hand, second end portion 59*b* of third spring 59 is attached to lever hole 54*e* of lever member 54. Lever member 54 rotates around first rotation axis 54*a* with respect to casing 30, and therefore lever hole 54*e* and in turn second end portion 59*b* of third spring 59 rotate around first rotation axis 54*a* with respect to casing 30. Thus, third spring 59 is displaced in accordance with rotation of second end portion 59*b*. In addition, third spring 59 elastically deforms in accordance with the rotation of second end portion 59*b*.

Lever hole 54*e* is formed in lever member 54 so as to pass between first rotation axis 54*a* and plate hole 56*a*1 of holding plate 56*a* when lever member 54 rotates around first rotation axis 54*a*. More specifically, lever hole 54*e* moves around first rotation axis 54*a* so as to be located at lock position Pa1, unlock position Pa2, and intermediate position Pa3 along trajectory L of the central axis of lever hole 54*e* indicated with the broken line.

Lock position Pa1 of lever hole 54*e* is the position of lever hole 54*e* when restriction part 54*d* is located at lock position Pk1. Unlock position Pa2 of lever hole 54*e* is the position of lever hole 54*e* when restriction part 54*d* is located at unlock position Pk2.

Intermediate position Pa3 of lever hole 54*e* is the position of lever hole 54*e* between lock position Pa1 and unlock position Pa2. When lever hole 54*e* is located at intermediate position Pa3, the central axis of lever hole 54*e* is located at the center of trajectory L. In addition, lever hole 54*e* and plate hole 56*a*1 are disposed such that lever hole 54*e* is closest to plate hole 56*a*1 when lever hole 54*e* is located at intermediate position Pa3.

Here, as illustrated in FIG. 11, the distance of lever hole 54*e* to plate hole 56*a*1 is smaller when it is located at intermediate position Pa3 than at lock position Pa1. In addition, the deformation amount of third spring 59 is set such that it is larger when lever hole 54*e* is located at intermediate position Pa3 than at lock position Pa1.

Further, lever member 54 rotates around first rotation axis 54*a* clockwise in FIG. 11 when lever hole 54*e* is located at located at lock position Pa1 than at intermediate position Pa3. Thus, when lever hole 54*e* is located at lock position Pa1, third spring 59 generates the elastic force in the direction in which plate hole 56*a*1 and lever hole 54*e* move away, and thus biases lever member 54 around first rotation axis 54*a* clockwise in FIG. 11.

Thus, when restriction part 54*d* is located at lock position Pk1, third spring 59 biases lever member 54 such that restriction part 54*d* continues to be located at lock position Pk1. In this manner, removal of restriction part 54*d* from lock position Pk1 can be suppressed.

In addition, as illustrated in FIG. 12, the distance of lever hole Me to plate hole 56*a*1 is smaller when it is located at intermediate position Pa3 than at unlock position Pa2. In addition, the deformation amount of third spring 59 is set such that it is larger when lever hole 54*e* is located at intermediate position Pa3 than at unlock position Pa2.

Further, lever member 54 rotates around first rotation axis 54*a* counterclockwise in FIG. 12 when lever hole 54*e* is located at unlock position Pa2 than at intermediate position Pa3. Therefore, when lever hole 54*e* is located at unlock position Pa2, third spring 59 generates an elastic force in the direction in which plate hole 56*a*1 and lever hole 54*e* move away, and thus biases lever member 54 around first rotation axis 54*a* counterclockwise in FIG. 12.

Thus, when restriction part 54*d* is located at unlock position Pk2, third spring 59 biases lever member 54 such that restriction part 54*d* continues to be located at unlock position Pk2. In this manner, removal of restriction part 54*d* from unlock position Pk2 can be suppressed.

As illustrated in FIGS. 4 and 6, restriction plate 22 is formed in a triangular plate shape in side view. In addition, restriction plate 22 is formed to protrude at the lower front end portion and the lower rear end portion. Restriction plate 22 is attached to door base 20 so as to be located on the upper side of base shaft member 31 in casing 30. Restriction plate 22 is attached to door base 20 through restriction shaft member 23.

Restriction shaft member 23 is formed in a columnar shape, and is disposed to extend leftward along the left-right direction from the left plate surface of door base 20. Restriction plate 22 is fit to restriction shaft member 23 at the upper end portion so as to be rotatable around restriction shaft member 23. In addition, second spring 24 is disposed at restriction shaft member 23. Second spring 24 is a torsion spring. Second spring 24 biases and rotates restriction plate 22 counterclockwise in FIG. 6 around restriction shaft member 23.

As illustrated in FIG. 6, regarding restriction plate 22, when door 3 is in a closed state and holding part 40 is located at close position Ph1, protrusion 13 makes contact with the rear surface and the rotation of second spring 24 is restricted.

As described above, when holding part 40 is rotated from close position Ph1 and set at open position Ph2, engage pin 12 and in turn protrusion 13 move to the opening of engaged portion 32 as illustrated in FIG. 8. In this manner, protrusion 13 moves rearward relative to restriction plate 22, and thus restriction plate 22 rotates around restriction shaft member 23 counterclockwise in FIG. 6 with the biasing force of second spring 24.

As illustrated in FIG. 8, the rotated restriction plate 22 is located at restriction position Ps where the lower front end portion makes contact with contacted surface 33*a* of protrusion 33. In the rotational direction around second rotation axis 31*a*, contacted surface 33*a* of protrusion 33 is the surface formed on the side opposite to the surface at which protrusion 33 makes contact with stopper 21 when holding part 40 is located at open position Ph2. When the lower front end portion of restriction plate 22 and contacted surface 33*a* of protrusion 33 are in contact with each other, the rotation of protrusion 33 and in turn casing 30 around second rotation axis 31*a* is restricted.

Figure 13:
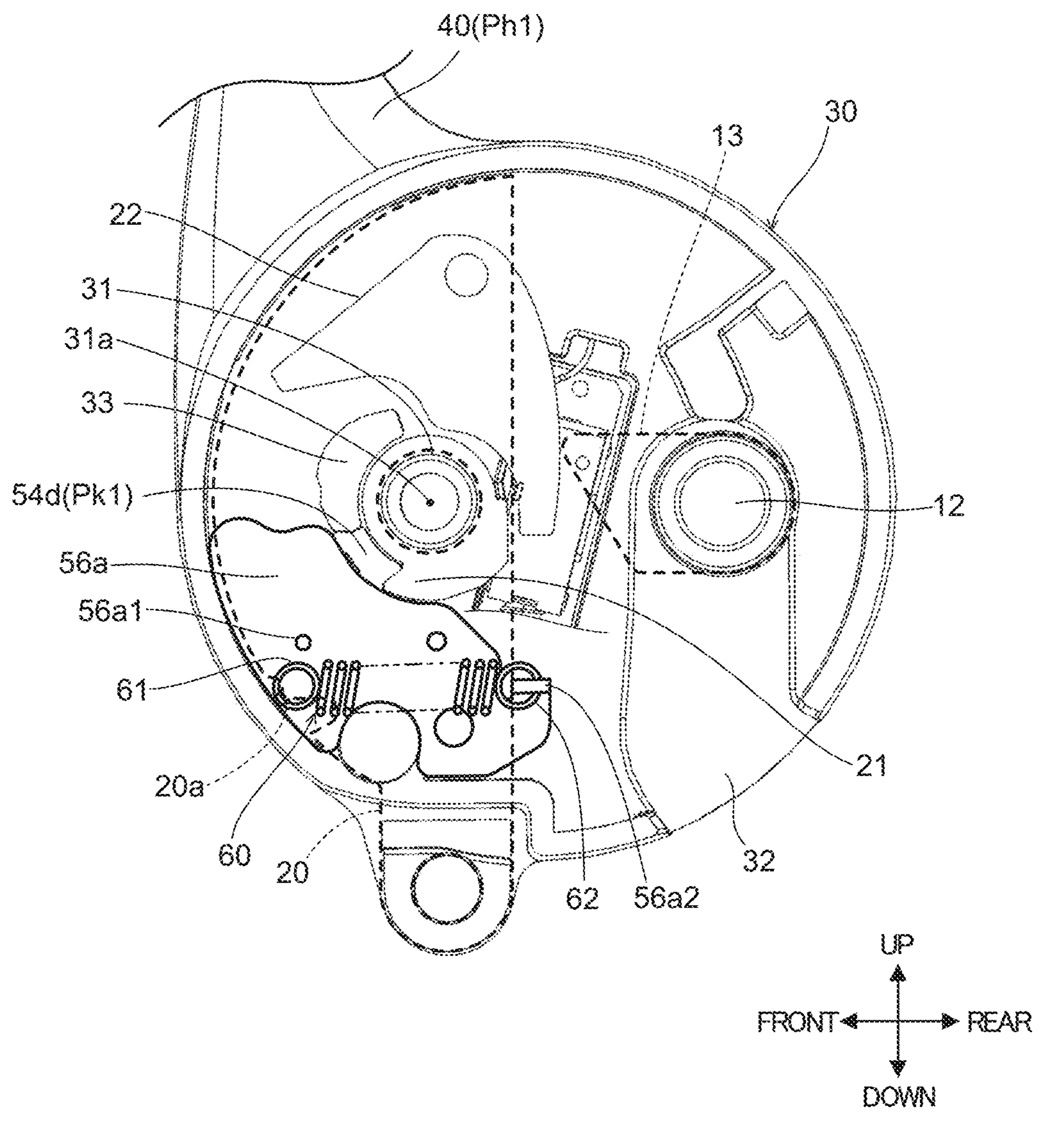
FIG. 13 is a partially enlarged sectional view of the handle for describing a fourth spring.
Figure 14:
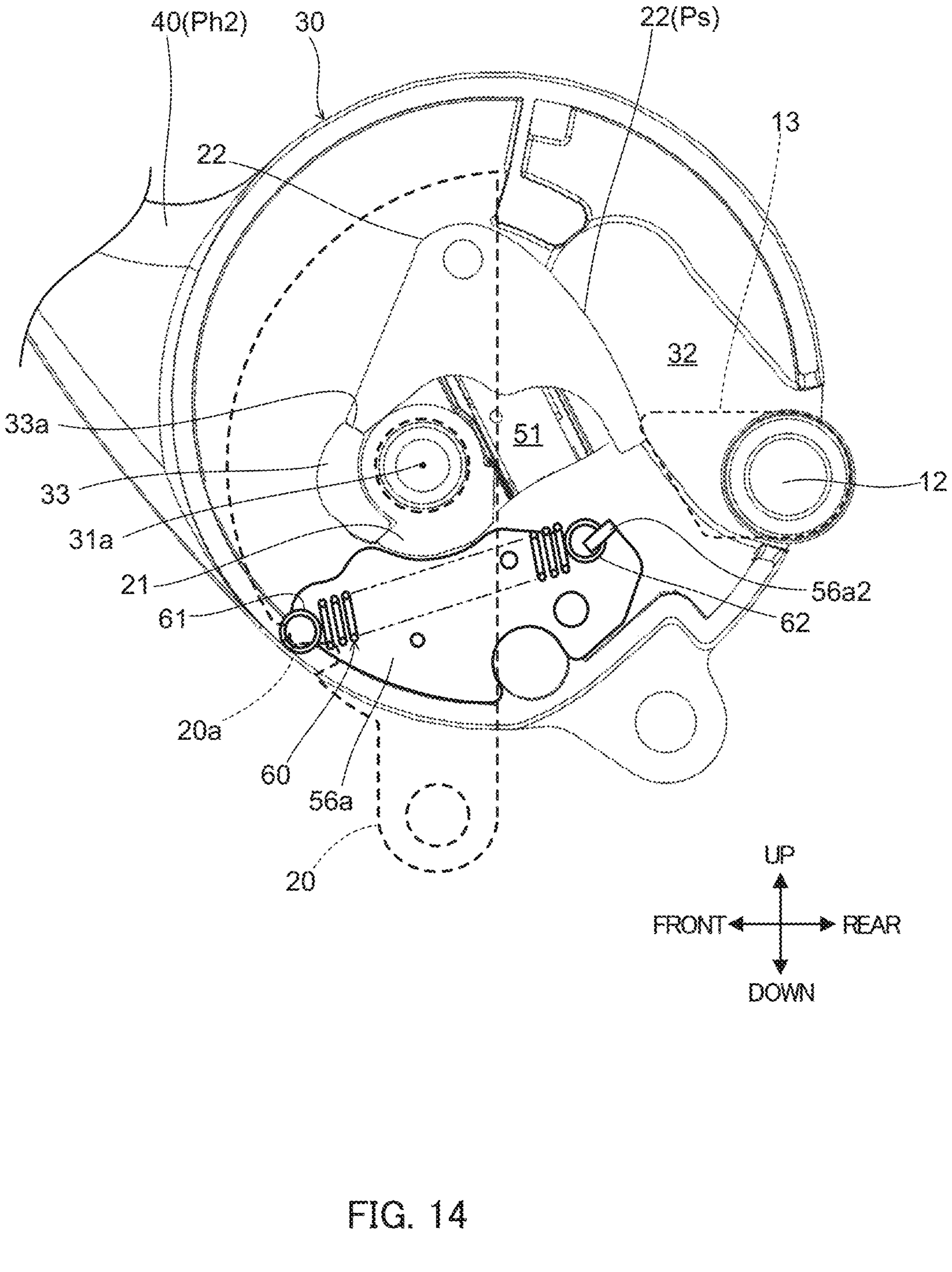
FIG. 14 is a partially enlarged sectional view of the handle for describing a fourth spring.

In addition, as illustrated in FIGS. 4, 13 and 14, locking device 50 further includes fourth spring 60. Fourth spring biases and rotates casing 30 clockwise in FIGS. 13 and 14. More specifically, fourth spring 60 is a tensile coil spring. Fourth spring 60 is disposed between holding plate 56*a* and door base 20.

First end portion 61 of fourth spring 60 is attached to hook part 20*a* of door base 20. Since door base 20 is fixed to door 3, first end portion 61 of fourth spring 60 does not move with respect to door base 20 even when casing 30 rotates (FIGS. 13 and 14).

Second end portion 62 of fourth spring 60 is attached to hook part 56*a*2 of holding plate 56*a*. Since holding plate 56*a* is attached to casing 30, second end portion 62 of fourth spring 60 moves with respect to door base 20 along with the rotation of casing 30 and in turn holding plate 56*a* when casing 30 rotates (FIGS. 13 and 14).

Fourth spring 60 functions to bring hook part 56*a*2 of holding plate 56*a* where second end portion 62 is attached closer to hook part 20*a* of door base 20 where first end portion 61 is attached within the rotational range of casing 30. That is, fourth spring 60 functions to rotate casing 30 counterclockwise in FIGS. 13 and 14. In this manner, when the user sets door 3 from the open state to the closed state and sets holding part 40 from open position Ph2 to close position Ph1, fourth spring 60 rotates casing 30 so as to set holding part 40 from open position Ph2 to close position Ph1. Thus, holding part 40 can reliably be set at close position Ph1.

Unlocking By Electromagnetic Actuator

Next, an operation of handle 4 in which locking device 50 is unlocked by an operation of electromagnetic actuator 51 and door 3 is set from the closed state to the open state is described from a state where locking device 50 is locked.

FIG. 6 illustrates a state where door 3 is in a closed state, holding part 40 is located at close position Ph1, and locking device 50 is locked. As described above, when holding part 40 is located at close position Ph1, restriction region R is formed between protrusion 33 and stopper 21 (FIG. 7). In addition, when locking device 50 is locked, movable iron core 51*b* of electromagnetic actuator 51 is located at advanced position Pp1.

When movable iron core 51*b* is located at advanced position Pp1, restriction part 54*d* of lever member 54 attached to movable iron core 51*b* through coupling member 55 is located at lock position Pk1 where it is fit to restriction region R. Note that in the state where key K is not inserted, pressure member 53*a* is located at reference position Po1. When restriction part 54*d* is located at lock position Pk1, pressure member 53*a* is in contact with first portion S1 in hole 54*c* of lever member 54.

When restriction part 54*d* is located at lock position Pk1, the rotation of protrusion 33 around second rotation axis 31*a* and in turn the rotation of holding part 40 from close position Ph1 to open position Ph2 are restricted as described above. That is, the operation of handle 4 is restricted. Further, when holding part 40 is located at close position Ph1 in the state where door 3 is in a closed state, engaged portion 32 of casing 30 and engage pin 12 are engaged with each other as described above, and thus door 3 is restricted from being set from the closed state to the open state.

When the user presses an unlocking switch (not illustrated in the drawing) disposed in operation panel 3*a* to unlock locking device 50, an unlocking signal for allowing the operation of handle 4 is output from the control device. In response to reception of the unlocking signal, control part 52 energizes magnetic coil 51*e* in the retraction direction. In this manner, movable iron core 51*b* retracts from advanced position Pp1 toward retraction position Pp2 as described above.

When coupling member 55 rotates clockwise in FIG. 5 around coupling shaft member 57 in accordance with the retraction of movable iron core 51*b*, attaching portion 54*b* of lever member 54 moves upward. Lever member 54 rotates counterclockwise in FIG. 6 around first rotation axis 54*a* in accordance with the upward movement of attaching portion 54*b*, and restriction part 54*d* is set from lock position Pk1 to unlock position Pk2 outside restriction region R as illustrated in FIG. 7.

Note that pressure member 53*a* is kept at reference position Po1 because the operation with key K is not performed. When lever member 54 rotates such that restriction part 54*d* moves from lock position Pk1 to unlock position Pk2, hole 54*c* rotates counterclockwise in FIG. 6 around first rotation axis 54*a* while pressure member 53*a* does not press the inner peripheral surface of hole 54*c* as described above. Thus, pressure member 53*a* does not inhibit the rotation of lever member 54. As illustrated in FIG. 7, when restriction part 54*d* is located at unlock position Pk2, pressure member 53*a* located at reference position Po1 is in contact with second portion S2 in hole 54*c* of lever member 54.

When restriction part 54*d* is located at unlock position Pk2, the rotation of protrusion 33 around second rotation axis 31*a* and in turn the rotation of holding part 40 from close position Ph1 to open position Ph2 are allowed as described above. That is, the operation of handle 4 is allowed.

When holding part 40 is rotated from close position Ph1 toward open position Ph2 by the user, casing 30 and in turn protrusion 33 rotate counterclockwise in FIG. 7 around second rotation axis 31*a*.

Since terminal T to which electric wire C is connected is disposed near second rotation axis 31*a* in electromagnetic actuator 51 as described above, the movement amount of terminal T and in turn the displacement amount of electric wire C connected to terminal T due to displacement are suppressed. Thus, the stress applied to electric wire C can be suppressed. Further, since the displacement amount of electric wire C is reduced, the length of electric wire C can be reduced. Thus, no obstruction is caused by electric wire C in casing 30.

Further, as described above, terminal T is disposed near second rotation axis 31*a* than the second end portion of movable iron core 51*b*. Attaching portion 54*b* is attached to the second end portion of movable iron core 51*b* through coupling member 55. That is, attaching portion 54*b* is disposed away from second rotation axis 31*a* and in turn base shaft member 31, than terminal T. Thus, the movement of attaching portion 54*b* and in turn the rotation amount of lever member 54 can be appropriately set without being limited by base shaft member 31.

Casing 30 and in turn protrusion 33 rotate and protrusion 33 makes contact with stopper 21, and thus, the rotation of protrusion 33 and in turn the rotation of holding part 40 are restricted, setting holding part 40 at open position Ph2 as illustrated in FIG. 8.

In addition, when holding part 40 is located at open position Ph2, engage pin 12 moves to the opening of engaged portion 32. In this manner, door 3 is allowed to be set from the closed state to the open state as described above.

When holding part 40 is located at open position Ph2, restriction plate 22 is located at restriction position Ps where the lower front end portion makes contact with contacted surface 33*a* of protrusion 33 as described above. In this manner, the rotation of protrusion 33 and in turn casing 30 around second rotation axis 31*a*, and in turn the formation of restriction region R between protrusion 33 and stopper 21 are restricted. Thus, restriction part 54*d* cannot move from unlock position Pk2 to lock position Pk1. That is, locking of locking device 50 is restricted when holding part 40 is located at open position Ph2 and door 3 is in the open state.

Locking By Electromagnetic Actuator

Next, an operation of handle 4 in which door 3 is set from the open state to the closed state, and locking device 50 is locked by an operation of electromagnetic actuator 51 is described from the open state of door 3 illustrated in FIG. 8.

As described above, when door 3 is in the open state, locking device 50 is unlocked, holding part 40 is located at open position Ph2, and restriction plate 22 is located at restriction position Ps. In the case where restriction plate 22 is located at restriction position Ps, when door 3 is closed and engage pin 12 moves toward the second end portion side (depth side) of engaged portion 32, protrusion 13 presses the rear surface of restriction plate 22 and thus restriction plate 22 rotates clockwise in FIG. 8 around restriction shaft member 23. With the rotation of restriction plate 22, restriction plate 22 moves away from restriction position Ps, and thus protrusion 33 and in turn casing 30 are allowed to rotate around second rotation axis 31*a*.

When door 3 is closed by the user and holding part 40 is rotated from open position Ph2 toward close position Ph1, casing 30 and in turn protrusion 33 rotate clockwise in FIG. 8 around second rotation axis 31*a*, and engage pin 12 is further advanced to the depth side (i.e., second end portion side) of engaged portion 32. When engage pin 12 is located at the second end portion of engaged portion 32, the rotation of casing 30 and in turn the rotation of holding part 40 are restricted, and thus holding part 40 is located at close position Ph1 as illustrated in FIG. 7.

When engage pin 12 is located at the second end portion of engaged portion 32, door 3 is restricted from being set from the closed state to the open state as described above. When holding part 40 is located at close position Ph1, restriction region R is formed between protrusion 33 and stopper 21.

When the user presses the lock switch (not illustrated in the drawing) disposed in operation panel 3*a* to lock locking device 50, the locking signal for restricting the operation of handle 4 is output from the control device. In response to reception of the locking signal, control part 52 energizes magnetic coil 51*e* in the advancing direction. In this manner, movable iron core 51*b* is advanced from retraction position Pp2 toward advanced position Pp1 as described above.

When coupling member 55 rotates counterclockwise in FIG. 5 around coupling shaft member 57 in accordance with the advance of movable iron core 51*b*, attaching portion 54*b* of lever member 54 move downward. Lever member 54 rotates clockwise in FIG. 7 around first rotation axis 54*a* in accordance with the downward movement of attaching portion 54*b*, and restriction part 54*d* is set from unlock position Pk2 to lock position Pk1 where it is fit to restriction region R as illustrated in FIG. 6.

Note that pressure member 53*a* is kept at reference position Po1 because the operation with key K is not performed. When lever member 54 rotates such that restriction part 54*d* moves from unlock position Pk2 to lock position Pk1, hole 54*c* rotates clockwise in FIG. 7 around first rotation axis 54*a* while pressure member 53*a* does not press the inner peripheral surface of hole 54*c* as described above. Thus, pressure member 53*a* does not inhibit the rotation of lever member 54.

As described above, with the operation of electromagnetic actuator 51, restriction part 54*d* moves between unlock position Pk2 and lock position Pk1. That is, locking device 50 is unlocked and locked through the operation of electromagnetic actuator 51.

Unlocking By Key

Next, an operation of handle 4 in which locking device 50 is unlocked by an unlocking operation of key K when holding part 40 is located at close position Ph1 is described from a state where locking device 50 is locked and key K is not inserted as illustrated in FIG. 6.

In the state where key K is not inserted, pressure member 53*a* is located at reference position Po1 as described above. When restriction part 54*d* is located at lock position Pk1 because locking device 50 is locked, pressure member 53*a* is in contact with first portion S1 in hole 54*c* of lever member 54.

When the unlocking operation is performed by the user by inserting key K to key hole H, pressure member 53*a* rotates clockwise in FIG. 6 around the central axis of manual rotation member 53 as described above and moves toward drawing position Po2 (FIG. 9).

When moving toward drawing position Po2, pressure member 53*a* presses first portion S1. In response to the press of first portion S1, lever member 54 rotates counterclockwise in FIG. 6 around first rotation axis 54*a*, restriction part 54*d* moves from lock position Pk1 toward unlock position Pk2, and attaching portion 54*b* moves upward. Further, in accordance with the upward movement of attaching portion 54*b*, movable iron core 51*b* coupled with attaching portion 54*b* through coupling member 55 moves from advanced position Pp1 toward retraction position Pp2 against the magnetic force of permanent magnet 51*d*.

As illustrated in FIG. 9, when pressure member 53*a* is located at drawing position Po2, pressure member 53*a* is in contact with first portion S1, restriction part 54*d* is located at unlock position Pk2, and movable iron core 51*b* is located at retraction position Pp2.

Further, when key K is rotated counterclockwise in FIG. 9 around the central axis of manual rotation member 53 by the operator to pull out key K, pressure member 53*a* moves from drawing position Po2 toward reference position Po1. In other words, pressure member 53*a* moves from first portion S1 toward second portion S2 in hole 54*c*. When pressure member 53*a* moves from drawing position Po2 toward reference position Po1, pressure member 53*a* moves in hole 54*c* without pressing the inner peripheral surface of hole 54*c*. That is, when pressure member 53*a* moves from drawing position Po2 toward reference position Po1, it moves away from first portion S1 without swaying lever member 54.

As illustrated in FIG. 7, when pressure member 53*a* returns to reference position Po1 in the state where restriction part 54*d* is located at unlock position Pk2, pressure member 53*a* makes contact with second portion S2 of hole 54*c* as described above. As described above, locking device 50 is unlocked through the unlocking operation of key K.

As described above, when pressure member 53*a* makes the first back-and-forth movement between reference position Po1 and drawing position Po2 in the state where restriction part 54*d* is located at lock position Pk1 (FIG. 6), pressure member 53*a* presses first portion S1 to rotate lever member 54 and set restriction part 54*d* at unlock position Pk2 in the forward movement of the first back-and-forth movement (FIG. 9). Further, pressure member 53*a* moves away from first portion S1 without rotating lever member 54 and moves toward second portion S2 in hole 54*c* in the backward movement of the first back-and-forth movement (FIG. 7).

Note that as illustrated in FIG. 9, when pressure member 53*a* makes the first back-and-forth movement between reference position Po1 and drawing position Po2 in the state where restriction part 54*d* is located at unlock position Pk2, pressure member 53*a* moves in hole 54*c* without pressing the inner peripheral surface. Thus, lever member 54 is located at unlock position Pk2 without being rotated.

In addition, in accordance with the unlocking operation of key K, movable iron core 51*b* of electromagnetic actuator 51 moves from advanced position Pp1 to retraction position Pp2 as described above. That is, electromagnetic actuator 51 performs the same operation as the operation of electromagnetic actuator 51 unlocking locking device 50 in accordance with the unlocking operation of key K without being energized. Thus, the state of locking device 50 where locking device 50 is unlocked by the unlocking operation of key K, and the state of locking device 50 where locking device 50 is unlocked by the above-described electromagnetic actuator 51 become the same (FIG. 7).

Locking By Key

Next, an operation of handle 4 when locking device 50 is locked through a locking operation of key K in the state where holding part 40 is located at close position Ph1 is described from a state where locking device 50 is unlocked and key K is not inserted as illustrated in FIG. 7.

In the state where key K is not inserted, pressure member 53*a* is located at reference position Po1 as described above. When restriction part 54*d* is located at unlock position Pk2 because locking device 50 is unlocked, pressure member 53*a* is in contact with second portion S2 in hole 54*c* of lever member 54.

When the locking operation is performed by inserting key K to key hole H by the user, pressure member 53*a* rotates counterclockwise in FIG. 7 around the central axis of manual rotation member 53 and moves toward push position Po3 as described above (FIG. 10).

When moving toward push position Po3, pressure member 53*a* presses second portion S2. When lever member 54 rotates clockwise in FIG. 7 around first rotation axis 54*a* in response to the press of second portion S2, restriction part 54*d* moves from unlock position Pk2 toward lock position Pk1, and attaching portion 54*b* moves downward. Further, in accordance with the downward movement of attaching portion 54*b*, movable iron core 51*b* coupled with attaching portion 54*b* through coupling member 55 moves from retraction position Pp2 toward advanced position Pp1 against the magnetic force of permanent magnet 51*d*.

At this time, long hole 55*b* in contact with attaching portion 54*b* is the force point, and groove part 55*a* in contact with movement shaft member 58 is the operation point. The distance to the fitted part of coupling shaft member 57 as the fulcrum is shorter from groove part 55*a* than from long hole 55*b*. Thus, manual rotation member 53 can be rotated with key K against the magnetic force of permanent magnet 51*d* of electromagnetic actuator 51 and the biasing force of first spring 51*c* with a smaller force than in the case where locking device 50 does not include coupling member 55 and movable iron core 51*b* is directly attached to attaching portion 54*b*.

As illustrated in FIG. 10, when pressure member 53*a* is located at push position Po3, restriction part 54*d* is located at lock position Pk1 and movable iron core 51*b* is located at advanced position Pp1.

Further, when key K is rotated clockwise in FIG. 10 around the central axis of manual rotation member 53 by the operator to pull out key K, pressure member 53*a* moves from push position Po3 toward reference position Po1. In other words, pressure member 53*a* moves from second portion S2 toward first portion S1 in hole 54*c*. When pressure member 53*a* moves from push position Po3 toward reference position Po1, pressure member 53*a* moves in hole 54*c* without pressing the inner peripheral surface of hole 54*c*. That is, when pressure member 53*a* moves from push position Po3 toward reference position Po1, it moves away from second portion S2 without swaying lever member 54.

As illustrated in FIG. 6, when restriction part 54*d* is located at lock position Pk1 and pressure member 53*a* returns to reference position Po1, pressure member 53*a* makes contact with first portion S1 of hole 54*c* as described above. As described above, locking device 50 is locked through the locking operation of key K.

As described above, when pressure member 53*a* makes the second back-and-forth movement between reference position Po1 and push position Po3 in the state where restriction part 54*d* is located at unlock position Pk2 (FIG. 7), pressure member 53*a* presses second portion S2 to rotate lever member 54 and set restriction part 54*d* to lock position Pk1 in the forward movement of the second back-and-forth movement (FIG. 10). Further, pressure member 53*a* moves away from second portion S2 without rotating lever member 54, and moves toward first portion S1 in hole 54*c* in the backward movement of the second back-and-forth movement (FIG. 6).

Note that as illustrated in FIG. 10, when pressure member 53*a* makes the second back-and-forth movement between reference position Po1 and push position Po3 in the state where restriction part 54*d* is located at lock position Pk1, pressure member 53*a* moves in hole 54*c* without pressing the inner peripheral surface. Thus, lever member 54 is set at lock position Pk1 without being rotated.

In addition, movable iron core 51*b* of electromagnetic actuator 51 moves from retraction position Pp2 to advanced position Pp1 in accordance with the locking operation of key K as described above. That is, electromagnetic actuator 51 makes the same operation as the operation of electromagnetic actuator 51 locking locking device 50 in accordance with the locking operation of key K with being energized. Thus, the state of locking device 50 where locking device 50 is locked through the locking operation of key K, and the state of locking device 50 where locking device 50 is locked by the above-described electromagnetic actuator 51 become the same (FIG. 6).

In addition, as described above, the state of locking device 50 where locking device 50 is unlocked through the unlocking operation of key K, and the state of locking device 50 where locking device 50 is unlocked by the above-described electromagnetic actuator 51 become the same (FIG. 7). Thus, even after locking device 50 is unlocked by either the unlocking operation of key K or the operation of electromagnetic actuator 51, locking device 50 can be locked by either the locking operation of key K or the operation of electromagnetic actuator 51. In addition, even after locking device 50 is locked by either the locking operation of key K or the operation of electromagnetic actuator 51, locking device 50 can be unlocked by either the unlocking operation of key K or the operation of electromagnetic actuator 51. That is, regardless of whether it has been locked by manual way or electrical way, the user can easily lock and unlock the door without the hassle of operating the handle. Even if the electronic lock cannot be used, for example, during a power failure, the key K can be used to reliably unlock the lock.

In addition, when the user sets door 3 from the open state to the closed state and moves holding part 40 from open position Ph2 to close position Ph1, the movement amount of protrusion 33 becomes insufficient if the rotation amount of casing 30 is insufficient. Consequently, the movement amount of restriction part 54*d* may become insufficient due to restriction part 54*d* interfering with protrusion 33, and restriction part 54*d* may not be set at restriction region R (FIG. 7), failing to lock with locking device 50.

In particular, in the case of the locking with electromagnetic actuator 51, the user cannot know the rotation amount of key K, i.e., the movement amount of restriction part 54*d* unlike the locking with key K. Consequently, at the time of locking with electromagnetic actuator 51, the user may not recognize the fact that the locking has not been made due to the insufficient movement amount of restriction part 54*d*.

However, when the user sets holding part 40 from open position Ph2 to close position Ph1, fourth spring 60 rotates casing 30 as described above. Thus, the rotation amount of casing 30 and in turn the movement amount of protrusion 33 do not become insufficient, and holding part 40 is reliably set to close position Ph1. Thus, restriction part 54*d* is located at restriction region R without interfering with protrusion 33, and the locking with locking device 50 can be reliably made. In addition, in the state where unlocking has been made with locking device 50, movement of holding part 40 from close position Ph1 to open position Ph2 against the user's will can be prevented.

Modification

The present disclosure is not limited to the forms described so far. As long as the main purpose of this disclosure is not departed from, various modifications to this embodiment and embodiments constructed by combining components in different embodiments are also included within the scope of this disclosure.

For example, attaching portion 54*b* of lever member 54 may be provided between first rotation axis 54*a* and hole 54*c*. In addition, hole 54*c* of lever member 54 may be provided between first rotation axis 54*a* and attaching portion 54*b*.

In addition, coupling member 55 may be engaged with movable iron core 51*b* on one end side, engaged with attaching portion 54*b* on the other end side, and fitted with coupling shaft member 57 between the one end side and the other end side.

In addition, electromagnetic actuator 51 may be disposed at casing 30 such that magnetic coil 51*e* is apart from second rotation axis 31*a* of base shaft member 31 than attaching portion 54*b*.

In addition, electromagnetic actuator 51 may be disposed in the direction orthogonal to lever member 54 and second rotation axis 31*a*.

In addition, locking device 50 may not include coupling member 55. In this case, the second end portion of movable iron core 51*b* is directly attached to attaching portion 54*b*. In this case, movable iron core 51*b* is an example of "moving member".

In addition, locking device 50 may not include third spring 59.

In addition, while locking device 50 is unlocked by electromagnetic actuator 51 in response to an operation of the unlocking switch in the above-described example, locking device 50 may be unlocked by electromagnetic actuator 51 in response to authentication of the user and an operation of the unlocking switch. Authentication of the user is performed using, for example, an ID card that stores identification information identifying the user and facial recognition.

In addition, electromagnetic actuator 51 may be configured with a push or pull solenoid.

In addition, locking device 50 may not include electromagnetic actuator 51. When electromagnetic actuator 51 is not provided, locking device 50 does not include coupling member 55. In this case, locking device 50 is locked and unlocked only by key K. In this case, the number of components can be reduced and locking device 50 can be configured in a cost-effective manner. In addition, since lever member 54 includes attaching portion 54*b*, electromagnetic actuator 51 can be retrofitted as needed, and the function of locking device 50 can be readily increased.

In addition, locking device 50 is applicable not only to refrigeration device 1, but also to devices including a box with a door, and the like.

This application is entitled to and claims the benefit of Japanese Patent Application No. 2020-189351 filed on Nov. 13, 2020, the disclosure each of which including the specification, drawings and abstract is incorporated herein by reference in its entirety.

INDUSTRIAL APPLICABILITY

The locking device of the present disclosure is widely applicable to ultra-low-temperature freezers, freezers, refrigerators and the like.

REFERENCE SIGNS LIST

1 Refrigeration device
3 Door
4 Handle
30 Casing
31 Base shaft member
31*a* Second rotation axis
40 Holding part
50 Locking device
51 Electromagnetic actuator
51*b* Movable iron core
51*e* Magnetic coil
53*a* Pressure member
54 Lever member
54*a* First rotation axis
54*b* Attaching portion
54*c* Hole
55 Coupling member (Moving member)
59 Third spring (Elastic member)
60 Fourth spring
F Plane
K Key
S1 First portion
S2 Second portion
T Terminal (Power receiving part)

The invention claimed is:

1. A locking device comprising:

a lever member configured to sway around a first rotation axis and including a restriction part configured to restrict an operation of a handle, a hole, and an attaching portion where a moving member configured to move in accordance with an operation of an electromagnetic actuator is attached; and a pressure member disposed in the hole and configured to make a first back-and-forth movement in the hole in accordance with an unlocking operation of a key, wherein the pressure member moves the restriction part from a position for restricting the operation of the handle to a position for allowing the operation of the handle by swaying the lever member around the first rotation axis by pressing a first portion in a forward movement of the first back-and-forth movement, and moves away from the first portion without swaying the lever member in a backward movement of the first back-and-forth movement, the first portion being a portion of an inner peripheral surface of the hole.

2. The locking device according to claim 1, wherein the pressure member is configured to make a second back-and-forth movement in the hole in accordance with a locking operation of the key; and wherein the pressure member moves the restriction part from the position for allowing the operation of the handle to the position for restricting the operation of the handle by swaying the lever member around the first rotation axis by pressing a second portion in a forward movement of the second back-and-forth movement, and moves away from the second portion without swaying the lever member in a backward movement of the second back-and-forth movement, the second portion being a portion of the inner peripheral surface of the hole.

3. The locking device according to claim 2, wherein a distance between the first portion and the second portion is greater than an outer diameter of the pressure member.

4. The locking device according to claim 1, wherein the attaching portion is provided on a side opposite to the hole with the first rotation axis located between the attaching portion and the hole.

5. The locking device according to claim 1, further comprising an elastic member configured to bias the lever member such that the restriction part continues to be located at the position for restricting the operation of the handle when the restriction part is located at the position for restricting the operation of the handle, and bias the lever member such that the restriction part continues to be located at the position for allowing the operation of the handle when the restriction part is located at the position for allowing the operation of the handle.

6. The locking device according to claim 1, further comprising the electromagnetic actuator, wherein the electromagnetic actuator includes a power receiving part;

wherein the handle includes a holding part configured to be grabbed for operation, and a casing connected with the holding part, the handle being configured to sway around a second rotation axis in accordance with the operation of the handle;

wherein the lever member, the pressure member and the electromagnetic actuator are disposed in the casing; and the power receiving part is disposed closer to the second rotation axis than the attaching portion.

7. The locking device according to claim 6, wherein the lever member and the electromagnetic actuator are disposed along a plane orthogonal to the second rotation axis with the plane sandwiched between the lever member and the electromagnetic actuator.

8. The locking device according to claim 6, wherein the moving member that is a member provided separately from the electromagnetic actuator, wherein the moving member includes a fulcrum, an operation point configured to make contact with the attaching portion, and a force point to which a force from the electromagnetic actuator is applied, the fulcrum being provided on one end side of the moving member, the operation point being provided on another end side of the moving member, the force point being provided between the fulcrum and the operation point.

9. A refrigeration device comprising the locking device according to claim 1.

* * * * *